United States Patent
Yamada et al.

(10) Patent No.: US 9,160,249 B2
(45) Date of Patent: Oct. 13, 2015

(54) POWER CONVERSION APPARATUS HAVING AN AC/DC CONVERTER WHICH OUTPUTS TO A DC/DC CONVERTER WHICH IS CONTROLLED BY A CONTROLLER

(75) Inventors: Masaki Yamada, Tokyo (JP); Ryota Kondo, Tokyo (JP); Ryosuke Kobayashi, Tokyo (JP); Takashi Kaneyama, Tokyo (JP); Kazutoshi Awane, Tokyo (JP); Satoshi Murakami, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 52 days.

(21) Appl. No.: 13/696,764

(22) PCT Filed: Nov. 30, 2010

(86) PCT No.: PCT/JP2010/071326
§ 371 (c)(1),
(2), (4) Date: Nov. 7, 2012

(87) PCT Pub. No.: WO2011/151940
PCT Pub. Date: Dec. 8, 2011

(65) Prior Publication Data
US 2013/0058134 A1    Mar. 7, 2013

(30) Foreign Application Priority Data
May 31, 2010   (JP) ................. 2010-124549

(51) Int. Cl.
*G05F 1/00* (2006.01)
*H02M 7/217* (2006.01)
*H02M 1/00* (2007.01)

(52) U.S. Cl.
CPC ........ *H02M 7/217* (2013.01); *H02M 2001/007* (2013.01)

(58) Field of Classification Search
USPC ............ 323/282–287; 363/44–48, 65, 67, 68, 363/71, 78, 79, 97, 98
See application file for complete search history.

(56) References Cited

U.S. PATENT DOCUMENTS 5,982,645 A * 11/1999 Levran et al. .................. 363/37
6,215,287 B1 * 4/2001 Matsushiro et al. .......... 323/222
(Continued)

FOREIGN PATENT DOCUMENTS

| JP | 4 317565 | 11/1992 |
| JP | 7 222444 | 8/1995 |

(Continued)

OTHER PUBLICATIONS

International Search Report Issued Mar. 15, 2011 in PCT/JP10/71326 Filed Nov. 30, 2010.
(Continued)

*Primary Examiner* — Adolf Berhane
*Assistant Examiner* — Gary Nash
(74) *Attorney, Agent, or Firm* — Oblon, McClelland, Maier & Neustadt, L.L.P.

(57) ABSTRACT

A power conversion apparatus includes a high-power-factor converter section converting an AC voltage to a DC voltage, a smoothing capacitor, a DC/DC converter section, and a control circuit. The control circuit controls the high-power-factor converter section such that the power factor of AC is controlled and a DC voltage follows a target value, and performs duty control for semiconductor switching devices such that a DC voltage from the DC/DC converter section to a load follows an instruction value. In accordance with the DC voltage, the control circuit adjusts the DC voltage target value of the high-power-factor converter section such that the duty ratio of the semiconductor switching devices approaches a set value, thereby optimizing the duty ratio of the semiconductor switching devices and reducing power loss.

18 Claims, 23 Drawing Sheets

(56) References Cited

U.S. PATENT DOCUMENTS

| | | | |
|---|---|---|---|
| 6,462,966 B1 * | 10/2002 | Leung et al. | 363/25 |
| 7,796,410 B2 | 9/2010 | Takayanagi et al. | |
| 2008/0284400 A1 * | 11/2008 | Oettinger et al. | 323/283 |
| 2009/0091957 A1 * | 4/2009 | Orr et al. | 363/79 |
| 2009/0147553 A1 * | 6/2009 | Ryu et al. | 363/65 |
| 2011/0215651 A1 | 9/2011 | Yamada et al. | |
| 2012/0014139 A1 | 1/2012 | Yamada et al. | |

FOREIGN PATENT DOCUMENTS

| | | |
|---|---|---|
| JP | 2000 116126 | 4/2000 |
| JP | 2002 237397 | 8/2002 |
| JP | 2006 121816 | 5/2006 |
| JP | 2007 282442 | 10/2007 |
| JP | 2007282442 A * | 10/2007 |
| JP | 2008 118727 | 5/2008 |
| JP | 2009 95160 | 4/2009 |
| WO | 2011 128942 | 10/2011 |

OTHER PUBLICATIONS

Office Action issued Oct. 29, 2013 in Japanese Patent Application No. 2012-518208 with partial English language translation.
U.S. Appl. No. 13/699,815, filed Nov. 26, 2012, Murakami et al.
Combined Chinese Office Action and Search Report issued on Jul. 3, 2014, in Patent Application No. 201080067139.8 with partial English translation and English translation of category of cited documents.
German Office Action dated Apr. 7, 2015 of the corresponding German Patent Application No. 11 2010 005 612.9, and a partial English translation thereof.

* cited by examiner

POWER CONVERSION APPARATUS HAVING AN AC/DC CONVERTER WHICH OUTPUTS TO A DC/DC CONVERTER WHICH IS CONTROLLED BY A CONTROLLER

TECHNICAL FIELD

The present invention relates to a power conversion apparatus comprising a circuit for improving an input power factor, the power conversion apparatus converting AC power to DC power and then obtaining a desired DC output.

BACKGROUND ART

A conventional power conversion apparatus includes: a high-power-factor converter section which performs high-power-factor control for a commercial AC power supply and performs AC/DC conversion; and a DC/DC converter section, provided at the subsequent stage of the high-power-factor converter section, in which the primary side and the secondary side are insulated by a transformer, whereby those sections respectively charge a main battery and a subsidiary battery insulated from each other. When the main battery is preferentially charged, the duty ratio of a switching circuit on the primary side of the transformer is controlled to be constant, and the duty ratio of a switching circuit on the secondary side of the transformer is controlled to be variable. When the subsidiary battery is preferentially charged, the duty ratios of the switching circuits on the primary side and the secondary side of the transformer are controlled to be variable (for example, see Patent Document 1).

CITATION LIST

Patent Document

Patent Document 1: Japanese Laid-Open Patent Publication No. 2008-118727

SUMMARY OF THE INVENTION

Problems to be Solved by the Invention

In the conventional power conversion apparatus, when the main battery or the subsidiary battery is charged, the duty ratio of the switching circuit on the secondary side of the transformer of the DC/DC converter section is controlled, or the duty ratios of the switching circuits on the primary side and the secondary side of the transformer are controlled. Thus, since control for obtaining a desired DC output is performed by duty control for the switching circuit, the variation width of the duty ratio necessarily increases, and power loss increases in the period in which the duty ratio is low. Therefore, there is a limit on reduction of power loss.

The present invention has been made to solve the above problem, and an object of the present invention is to reduce power loss and improve the power conversion efficiency, in a power conversion apparatus comprising a circuit for improving an input power factor, the power conversion apparatus converting AC power to DC power and then obtaining a desired DC output.

Solution to the Problems

A first power conversion apparatus according to the present invention includes: an AC/DC converter section which converts an AC voltage to a DC voltage; a smoothing capacitor connected to the DC side of the AC/DC converter section; a DC/DC converter section, comprising a semiconductor switching device, which performs DC/DC conversion for DC power of the smoothing capacitor and outputs the resultant power to a load; and a control apparatus which controls the AC/DC converter section such that the power factor of AC is controlled and the DC voltage of the AC/DC converter section follows a target value, and which controls the DC/DC converter section by duty control for the semiconductor switching device such that a DC input/output between the DC/DC converter section and the load follows an instruction value. The control apparatus adjusts the DC voltage target value of the AC/DC converter section in accordance with the DC input/output between the DC/DC converter section and the load.

A second power conversion apparatus according to the present invention includes: an AC/DC converter section which converts an AC voltage to a DC voltage; a smoothing capacitor connected to the DC side of the AC/DC converter section; a DC/DC converter section, comprising a semiconductor switching device, which performs DC/DC conversion for DC power of the smoothing capacitor and outputs the resultant power to a load; and a control apparatus which controls the AC/DC converter section such that the power factor of AC is controlled and the DC voltage of the AC/DC converter section follows a target value, and which controls the DC/DC converter section by duty control for the semiconductor switching device such that a DC input/output between the DC/DC converter section and the load follows an instruction value. The control apparatus adjusts the DC voltage target value of the AC/DC converter section so as to allow the semiconductor switching device in the DC/DC converter section to perform soft switching.

Effect of the Invention

According to the above first power conversion apparatus, the control apparatus adjusts the DC voltage target value of the AC/DC converter section in accordance with the DC input/output between the DC/DC converter section and the load. Therefore, it is possible to appropriately control the duty ratio of the semiconductor switching device in the DC/DC converter section, thereby reducing power loss of the DC/DC converter section and improving power conversion efficiency.

According to the above second power conversion apparatus, the control apparatus adjusts the DC voltage target value of the AC/DC converter section so as to allow the semiconductor switching device in the DC/DC converter section to perform soft switching. Therefore, it is possible to reduce switching loss of the semiconductor switching device in the DC/DC converter section, thereby reducing power loss of the DC/DC converter section and improving power conversion efficiency.

EMBODIMENTS OF THE INVENTION

Embodiment 1

Hereinafter, embodiment 1 of the present invention will be described.

Figure 1:
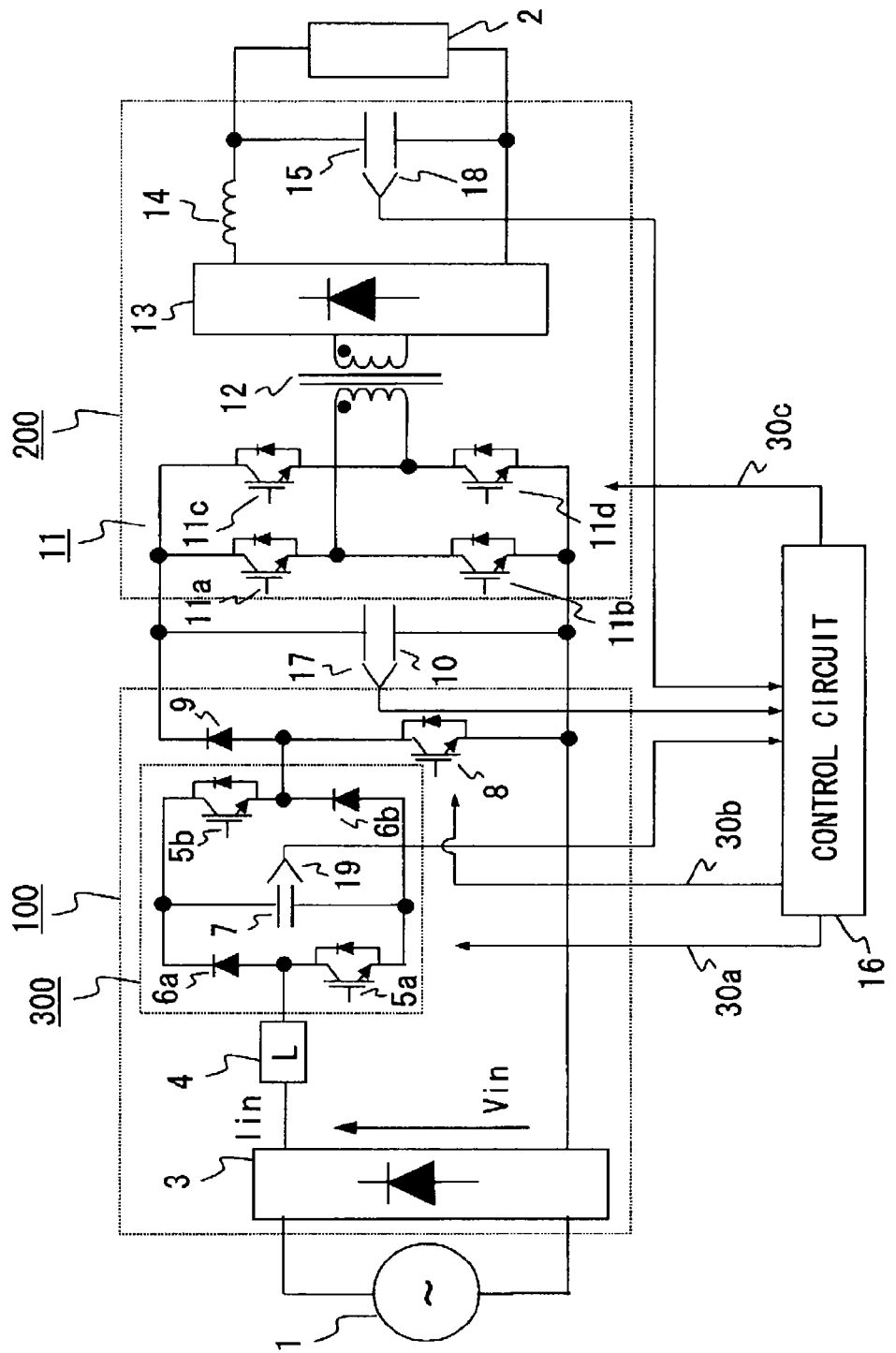
FIG. 1 is a configuration diagram of a power conversion apparatus according to embodiment 1 of the present invention.

FIG. 1 is a diagram showing the circuit configuration of a power conversion apparatus according to embodiment 1 of the present invention. As shown in FIG. 1, a main circuit of the power conversion apparatus includes: a high-power-factor converter section 100 as an AC/DC converter, connected to an AC voltage source 1, which controls the power factor of an input AC to be high and converts an AC voltage to a DC voltage; a smoothing capacitor 10 which smoothes a DC output of the high-power-factor converter section 100; and a DC/DC converter section 200 which converts the voltage of the smoothing capacitor 10 to a secondary-side DC voltage insulated by a transformer 12. In addition, a load 2 such as a battery, for example, is connected to the output of the DC/DC converter section 200.

The high-power-factor converter section 100 includes: a diode bridge 3, connected to the AC voltage source 1, which processes the input AC by full-wave rectification; an inverter circuit 300 connected in series via a reactor 4, at the subsequent stage of the diode bridge 3; and a bridge circuit in which a short-circuit switch 8 composed of a semiconductor switching device, and a diode 9 are connected in series, at the subsequent stage of the inverter circuit 300. The inverter circuit 300 is composed of one or more (in this case, one) single-phase inverters whose AC sides are connected in series, each single-phase inverter being composed of: semiconductor switching devices 5a and 5b which are self-turn-off semiconductor switching devices such as IGBTs (Insulated Gate Bipolar Transistors); diodes 6a and 6b; and a DC voltage source 7 composed of a capacitor. In addition, the short-circuit switch 8 one end of which is connected to the output of the diode bridge 3, and the diode 9 whose cathode side is connected to the smoothing capacitor 10 on the output side, are connected to the output of the inverter circuit 300.

The DC/DC converter section 200 includes: the transformer 12 that is insulated; a converter section 11, connected to the primary side of the transformer 12, which converts a DC voltage of the smoothing capacitor 10 to the AC voltage by a full-bridge converter composed of semiconductor switching devices 11a to 11d; and a diode bridge 13 which is a rectification circuit connected to the secondary side of the transformer 12. In addition, a reactor 14 and a capacitor 15 for output smoothing, are connected to the output of the diode bridge 13, whereby a DC voltage is outputted to the load 2.

Further, a control circuit 16 as a control apparatus is provided outside the main circuit, and outputs drive signals 30a and 30b to the semiconductor switching devices 5a and 5b and the short-circuit switch 8 in the high-power-factor converter section 100, and a drive signal 30c to the semiconductor switching devices 11a to 11d in the DC/DC converter section 200. In addition, a voltage Vdc of the smoothing capacitor 10 is monitored by a voltage sensor 17, a voltage Vout of the capacitor 15 is monitored by a voltage sensor 18, and a voltage Vsub of the DC voltage source 7 is monitored by a voltage sensor 19. Then, these voltages are inputted to the control circuit 16.

Next, operation will be described.

Figure 2:
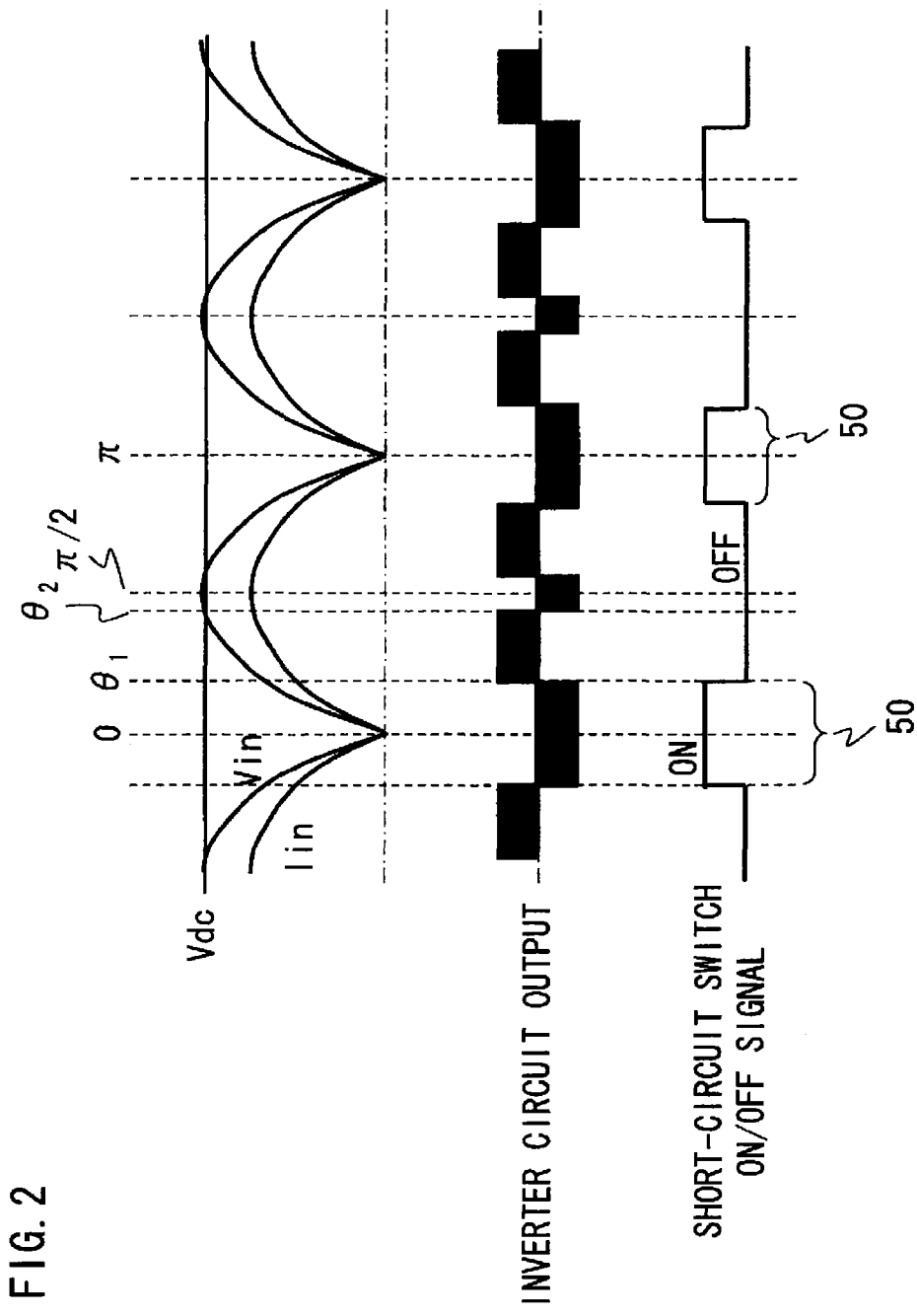
FIG. 2 is a waveform diagram of each section for illustrating the operation of a high-power-factor converter section according to embodiment 1 of the present invention.

First, in the high-power-factor converter section 100, an input from the AC voltage source 1 is processed by full-wave rectification by the diode bridge 3, whereby a voltage Vin and a current Iin at the subsequent stage of the diode bridge 3 have waveforms as shown in FIG. 2. Vdc is the DC voltage of the smoothing capacitor 10, which is controlled to be a target voltage Vdc* as an output voltage target value that is constant. The DC voltage Vdc is sensed by the voltage sensor 17.

Figure 3:
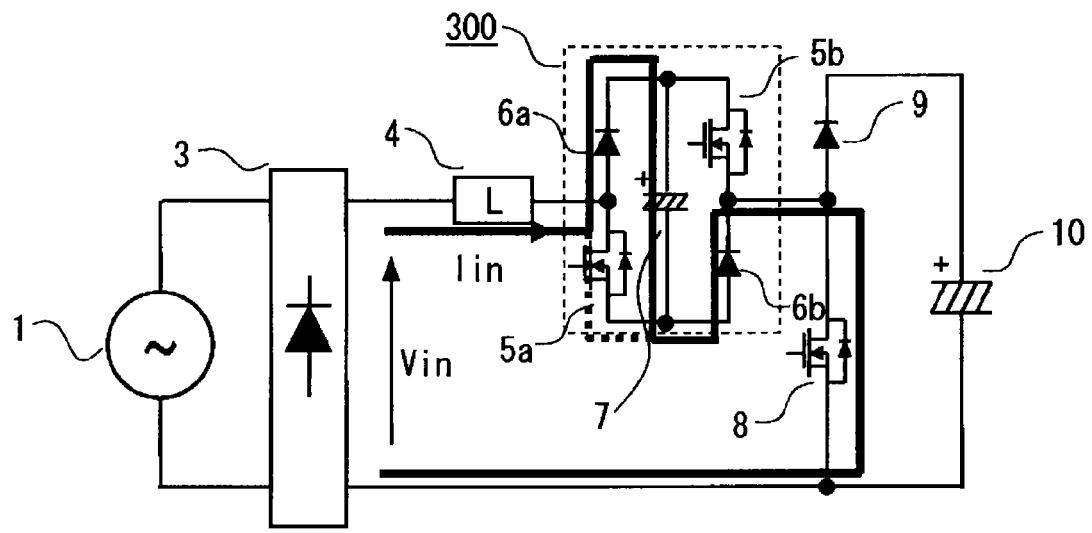
FIG. 3 is a diagram illustrating the operation of the high-power-factor converter section according to embodiment 1 of the present invention.
Figure 4:
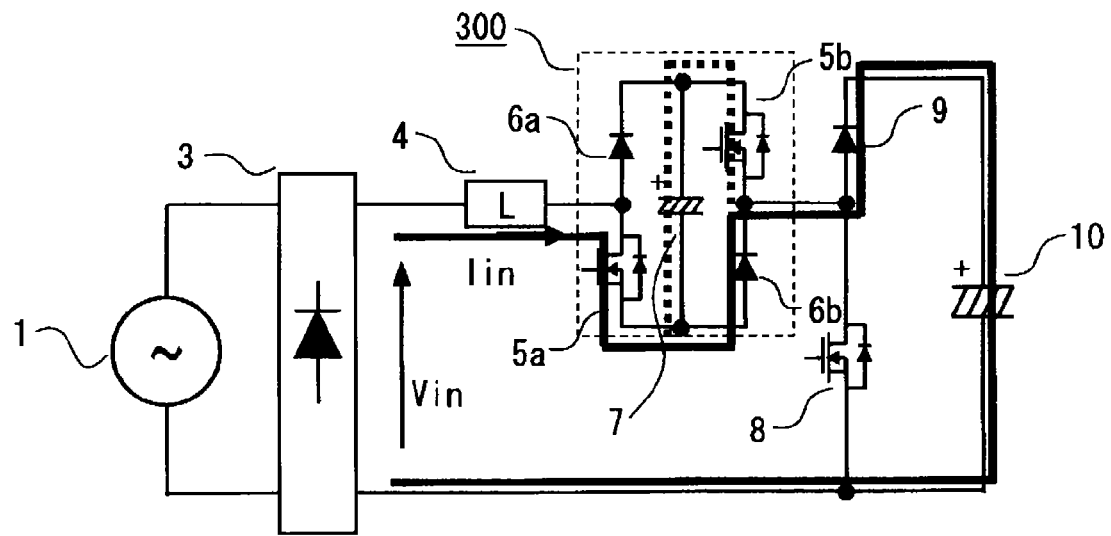
FIG. 4 is a diagram illustrating the operation of the high-power-factor converter section according to embodiment 1 of the present invention.
Figure 5:
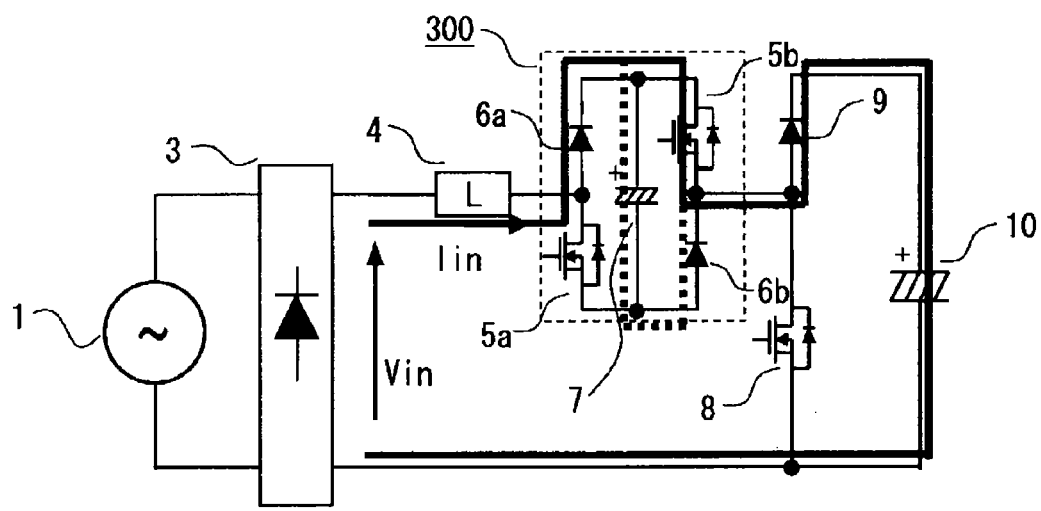
FIG. 5 is a diagram illustrating the operation of the high-power-factor converter section according to embodiment 1 of the present invention.

The inverter circuit 300 controls and outputs the current Iin by PWM control such that the input power factor from the AC voltage source 1 is about 1, and superimposes a generated voltage on the AC side onto the voltage Vin at the subsequent stage of the diode bridge 3. As shown in FIGS. 3 to 5, when the semiconductor switching devices 5a and 5b are OFF, a current in the inverter circuit 300 passes through the diode 6a to charge the DC voltage source 7, and is outputted through the diode 6b. When only the semiconductor switching device 5a is ON, the current is outputted through the semiconductor switching device 5a and the diode 6b. Similarly, when only the semiconductor switching device 5b is ON, the current is outputted through the diode 6a and the semiconductor switching device 5b. When the semiconductor switching devices 5a and 5b are both ON, the current passes through the semiconductor switching device 5a to cause the DC voltage source 7 to discharge, and is outputted through the semiconductor switching device 5b. The semiconductor switching devices 5a and 5b are controlled by a combination of the above four types of control, thereby performing PWM control for the inverter circuit 300.

Here, $\theta$ indicates the input voltage phase from the AC voltage source 1, and $\theta_2$ ($0<\theta_2<\Pi/2$) is defined as the phase $\theta$ where the voltage Vin is equal to the target voltage Vdc* of the smoothing capacitor 10. The short-circuit switch 8 is ON from the phase $\theta=0$ until a predetermined phase $\theta_1$ ($0<\theta_1<\theta_2$). In this case, as shown in FIG. 3, a current from the AC voltage source 1 flows through a route of the AC voltage source 1→the diode bridge 3→the reactor 4→the inverter circuit 300→the short-circuit switch 9→the diode bridge 3→the AC voltage source 1. Since the short-circuit switch 8 is ON, a current does not flow in the diode 9 and in the smoothing capacitor 10 at the output stage.

By PWM control, the inverter circuit 300 generates a voltage substantially equal to the opposite polarity of the voltage Vin by a combination of, for example, the case where the semiconductor switching devices 5a and 5b are OFF and the case where only the semiconductor switching device 5a is ON, and controls and outputs the current Iin such that the input power factor is about 1. During this period, the DC voltage source 7 of the inverter circuit 300 is charged with energy.

Next, at the phase $\theta=\theta_1$, when the short-circuit switch 8 is turned off, as shown in FIG. 4, a current from the AC voltage source 1 flows through a route of the AC voltage source 1→the diode bridge 3→the reactor 4→the inverter circuit 300→the diode 9→the smoothing capacitor 10→the diode bridge 3→the AC voltage source 1.

When the phase $\theta$ is in a range of $\theta_1 \leq \theta \leq \theta_2$, by PWM control, the inverter circuit 300 makes an output by a combination of, for example, the case where the semiconductor switching devices 5a and 5b are both ON and the case where only the semiconductor switching device 5a is ON. At this time, the inverter circuit 300 generates a voltage substantially equal to (Vdc*−Vin) such that the DC voltage Vdc of the smoothing capacitor 10 is maintained at the target voltage Vdc*, and controls and outputs the current Iin such that the input power factor is about 1. During this period, since the polarity of a voltage generated by the inverter circuit 300 is equal to the polarity of the current Iin, the DC voltage source 7 of the inverter circuit 300 discharges.

Next, at the phase $\theta=\theta_2$, when the voltage Vin has become equal to the DC voltage Vdc* of the smoothing capacitor 10, the short-circuit switch 8 continues to be OFF, but the operation of the inverter circuit 300 changes.

That is, when the phase $\theta$ is in a range of $\theta_2 \leq \theta \leq \Pi/2$, as shown in FIG. 5, a current from the AC voltage source 1 flows through a route of the AC voltage source 1→the diode bridge 3→the reactor 4→the inverter circuit 300→the diode 9→the smoothing capacitor 10→the diode bridge 3→the AC voltage source 1. In addition, by PWM control, the inverter circuit 300 makes an output by a combination of, for example, the case where the semiconductor switching devices 5a and 5b are OFF and the case where only the semiconductor switching device 5a is ON. At this time, since the target voltage Vdc* of the smoothing capacitor 10 is equal to or lower than the voltage Vin, the inverter circuit 300 generates a voltage being substantially equal to (Vin−Vdc*) and having a polarity opposite to that of the voltage Vin, such that the DC voltage Vdc of the smoothing capacitor 10 is maintained at the target voltage Vdc*, and controls and outputs the current Iin such that the input power factor is about 1. During this period, since the polarity of a voltage generated by the inverter circuit 300 is opposite to the polarity of the current Iin, the DC voltage source 7 of the inverter circuit 300 is charged.

As shown in FIG. 2, the operation in a phase period of $\Pi/2 \leq \theta \leq \Pi$ is symmetrical to that in a phase period of $0 \leq \theta \leq \Pi/2$ described above, and the operation in a phase period of $\Pi \leq \theta \leq 2\Pi$ is the same as that in a phase period of $0 \leq \theta \leq \Pi$.

That is, when the phase $\theta$ of the input voltage from the AC voltage source 1 is (a zero cross phase ($\theta=0$, $\Pi$)$\pm\theta_1$), the short-circuit switch 8 is switched, and only in a range (hereinafter, referred to as a short-circuit phase range 50) between $\pm\theta_1$ centered at the zero cross phase, the short-circuit switch 8 becomes ON, thereby bypassing the smoothing capacitor 10. At this time, the inverter circuit 300 generates a voltage substantially equal to the opposite polarity voltage of the voltage Vin, and controls and outputs the current Iin such that the input power factor is about 1, while the DC voltage source 7 is charged. Then, in the phase range other than the short-circuit phase range 50, the inverter circuit 300 maintains the DC voltage Vdc of the smoothing capacitor 10 at the target voltage Vdc*, and controls and outputs the current Iin such that the input power factor is about 1. At this time, when the voltage Vin is equal to or lower than the target voltage Vdc* of the smoothing capacitor 10, the DC voltage source 7 discharges, and when the voltage Vin is equal to or higher than the target voltage Vdc*, the DC voltage source 7 is charged.

If $\theta_1$ is increased, energy to charge the DC voltage source 7 increases, and thereafter, at the time of discharge, a generated voltage can be superimposed onto the voltage Vin in a high voltage region and energy to be discharged can be increased. Therefore, the DC voltage Vdc (target voltage Vdc*) of the smoothing capacitor 10 can be increased.

In a phase period of $0 \leq \theta \leq \Pi/2$, the DC voltage source 7 of the inverter circuit 300 is charged during a period of $0 \leq \theta \leq \theta_1$ and a period of $\theta_2 \leq \theta \leq \Pi/2$, and discharges during a period of $\theta_1 \leq \theta \leq \theta_2$, as described above.

Next, the detailed operation for maintaining the DC voltage Vdc of the smoothing capacitor 10 at the target voltage Vdc* and controlling the current Iin such that the input power factor is about 1 will be described below.

Figure 6:
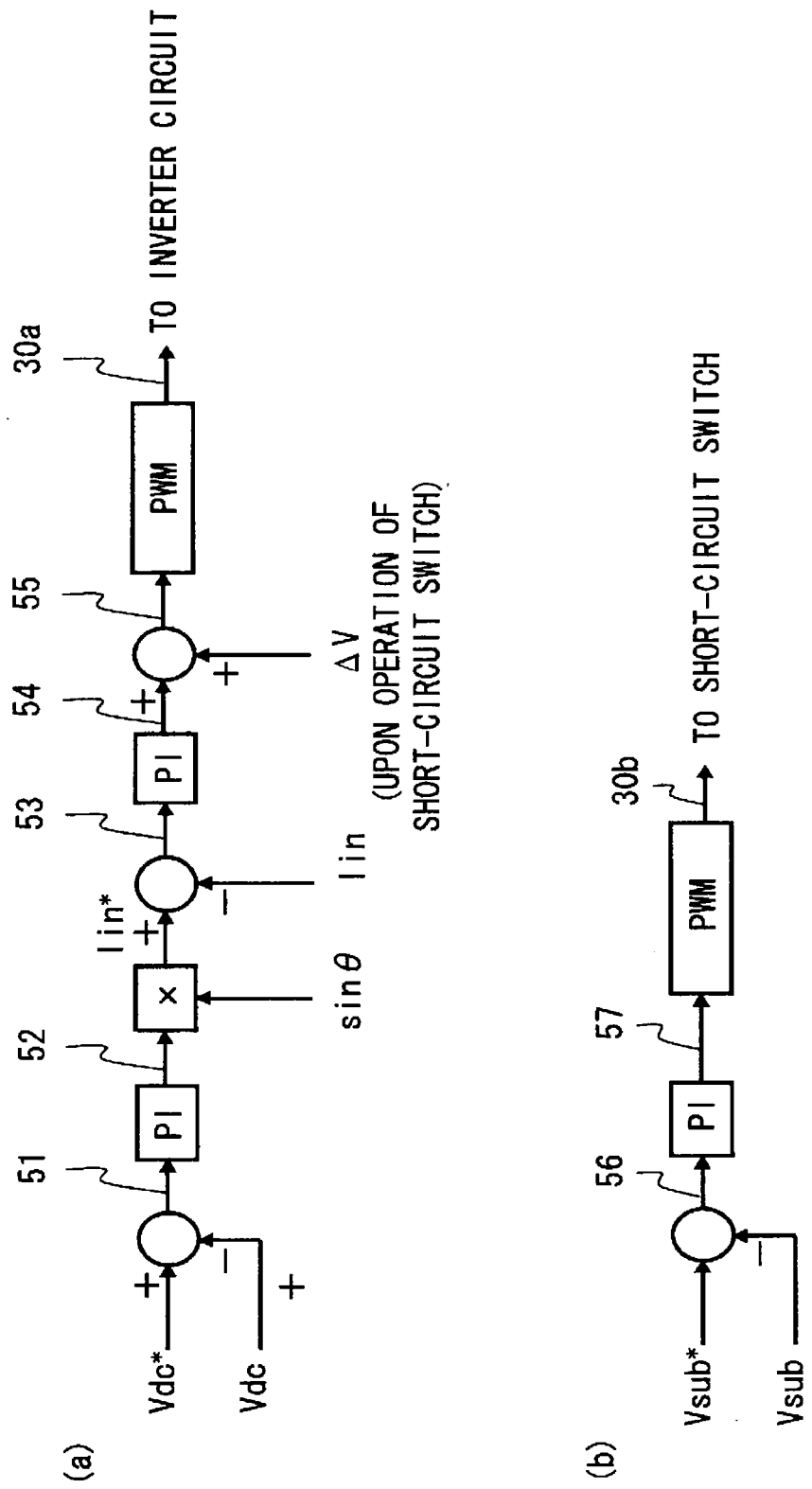
FIG. 6 is a control block diagram showing the control for the high-power-factor converter section according to embodiment 1 of the present invention.

The high-power-factor converter section 100 is controlled in accordance with a control block as shown in FIG. 6. FIG. 6(*a*) is a diagram showing control for the inverter circuit 300, and FIG. 6(*b*) is a diagram showing control for the short-circuit switch 8 of the bridge circuit.

As shown in FIG. 6(*a*), in the control for the inverter circuit 300, feedback control (PI control) is performed such that a difference 51 between the DC voltage Vdc of the smoothing capacitor 10 detected by the voltage sensor 17, and the target voltage Vdc* of the smoothing capacitor set in advance, approaches zero, whereby an amplitude target value 52 of the current Iin is determined. Then, based on the amplitude target value 52, a current instruction Iin* which is a sine wave synchronized with the voltage Vin is generated.

Next, feedback control (PI control) is performed such that a difference 53 between the current instruction Iin* and the detected current Iin approaches zero, whereby a voltage instruction 54 as a target value of a generated voltage of the inverter circuit 300 is outputted. At this time, the voltage instruction 54 is corrected by adding thereto a feedforward correction voltage ΔV synchronized with a time of ON/OFF switching of the short-circuit switch B.

As described above, when the short-circuit switch 8 is switched from on to off, the capacitor 7 of the inverter circuit 300 is switched from charge to discharge, and when the short-circuit switch 8 is switched from off to on, the capacitor 7 is switched from discharge to charge. By using feedforward control at the time of the ON/OFF switching, it is possible to cancel the control delay corresponding to a response time of the feedback control, and a voltage generated between both ends of the reactor 4 for current limiting. Thus, it is possible to reduce drastic variation in a current due to the ON/OFF switching of the short-circuit switch 8.

It is noted that the feedforward correction voltage ΔV is positive when the semiconductor switching device 8 is turned from on to off, and is negative when the semiconductor switching device 8 is turned from off to on.

Then, based on the corrected voltage instruction 55, the drive signal 30a for each of the semiconductor switching devices 5a to 5b of the inverter circuit 300 is generated by PWM control, whereby the inverter circuit 300 is operated.

On the other hand, as shown in FIG. 6(b), in the control for the short-circuit switch 8, the voltage Vsub of the capacitor 7 of the inverter circuit 300 detected by the voltage sensor 19 is monitored, and feedback control (PI control) is performed such that a difference 56 between the voltage Vsub and the target voltage Vsub* of the DC voltage source 7 as a voltage instruction value set in advance approaches zero, thereby obtaining an output 57. Based on the output 57, the drive signal 30b for the short-circuit switch 8 is generated by PWM control. Thus, a phase range in which the short-circuit switch 8 is ON, that is, the short-circuit phase range 50 is also controlled.

In such control for the short-circuit switch 8, the higher the voltage value obtained by subtracting the voltage Vsub of the DC voltage source 7 from the target voltage Vsub* is, the longer the ON-period of the short-circuit switch 8 is. Therefore, even if the voltage Vsub varies because of transient load variation or variation in the AC voltage source 1, it is possible to control the period for charging the DC voltage source 7, and to control the voltage Vsub of the DC voltage source 7 to be constant.

Therefore, without separately providing an external DC voltage source, it is possible to, in spite of transient variation in the AC voltage source 1 or a load, stabilize the voltage of the DC voltage source 7 of the inverter circuit 300 and keep the DC bus voltage of the inverter circuit 300 to be constant, thereby stably operating the high-power-factor converter section 100.

Next, operation of the DC/DC converter section 200 will be described below.

In the DC/DC converter section 200, a voltage is generated on the primary side of the transformer 12 in a period in which the semiconductor switching devices 11a and 11d are both ON and in a period in which the semiconductor switches devices 11b and 11c are both ON, among the semiconductor switching devices 11a to 11d of the converter section 11 on the primary side of the transformer 12, whereby power is transmitted to the secondary side. In general, the switching of the semiconductor switching devices 11a to 11d is performed by high-frequency PWM operation, such that the length of the period in which the semiconductor switching devices 11a and 11d are both ON is equal to the length of the period in which the semiconductor switches devices 11b and 11c are both ON.

Figure 7:
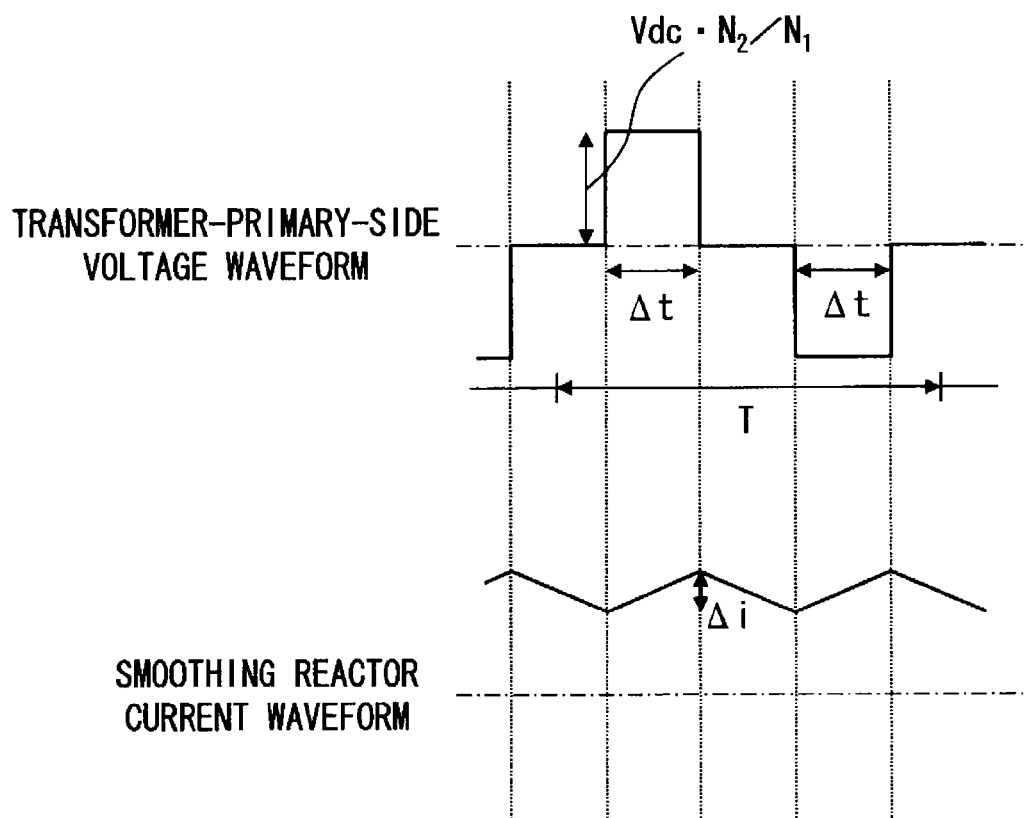
FIG. 7 is a waveform diagram of each section for illustrating the operation of a DC/DC converter section according to embodiment 1 of the present invention.

FIG. 7 shows a voltage and a current generated on the secondary side of the transformer when the two semiconductor switching devices 11a and 11d (or 11b and 11c) are both ON. If $N_1$ is the turns number of the primary winding and $N_2$ is the turns number of the secondary winding of the transformer 12, as shown in FIG. 7, a voltage of $Vdc \cdot N_2/N_1$ is generated on the secondary winding in the period in which the two semiconductor switching devices 11a and 11d (or 11b and 11c) are both ON. As a result, a current that increases during the period in which the voltage is generated on the secondary winding and then decreases, flows in the reactor 14 for smoothing. It is noted that T is a switching cycle of the semiconductor switching devices 11a to 11d, Δt is ON-time in which the semiconductor switching devices 11a and 11d (or 11b and 11c) are both ON, and Δi is an increment in a current flowing in the reactor 14 for smoothing.

At this time, the following Expression (1) is obtained, where L is the inductance of the reactor 14 for smoothing, and Vout is the DC output voltage of the capacitor 15 for output.

$$\Delta i = ((Vdc \cdot N_2/N_1 - Vout) \cdot \Delta t)/L \qquad \text{Expression (1)}$$

In a period between the period in which the semiconductor switching devices 11a and 11d are both ON and the period in which the semiconductor switching devices 11b and 11c are both ON, a current on the secondary side of the transformer flows back through a route of the reactor 14 for smoothing→the capacitor 15→the diode bridge 13→the reactor 14 for smoothing, whereby the current decreases.

Next, control for the DC/DC converter section 200 to control the DC output voltage Vout to be the voltage instruction value Vout* will be described below with reference to FIG. 8.

The voltage Vout of the capacitor 15 is sensed by the voltage sensor 18, and is outputted to the control circuit 16. In the control circuit 16, as shown in FIG. 8, the voltage Vout is compared with the voltage instruction value Vout*, the error is amplified by an error amplifying section 19, and then the drive signal 30c (30ca and 30cb) for driving the semiconductor switching devices 11a and 11d and the semiconductor switching devices 11b and 11c of the converter section 11 is outputted by a PWM control section 20. Thus, the voltage Vout of the capacitor 15 is controlled so as to approach the voltage instruction value Vout*.

Since in the converter section 11, the control for turning on both semiconductor switching devices 11a and 11d, and the control for turning on both semiconductor switching devices 11b and 11c, are alternately performed with the same ON-time Δt for each, the drive signal 30c for the semiconductor switching signals 11a to 11d is a duty instruction for determining the duty ratio (2Δt/T), and each of the semiconductor switching signals 11a to 11d is duty-controlled based on the duty instruction.

Here, it will be assumed that the voltage Vdc of the smoothing capacitor 10, which is the output voltage of the high-power-factor converter section 100 and also the input voltage of the DC/DC converter section 200, is constant. In this case, if the output voltage Vout which is a DC output to the load 2 is high, the duty ratio of the semiconductor switching signals 11a to 11d is large, and if the output voltage Vout is low, the duty ratio is small. When the duty ratio of the semiconductor switching devices 11a to 11d is decreased, the period in which the transformer 12 of the DC/DC converter section 200 transmits power from the primary side to the secondary side becomes short, and the usage rate of the transformer 12 decreases. In the periods other than the period in which the transformer 12 transmits power from the primary side to the secondary side, a current flows back on the primary side of the transformer 12. If the flow-back period increases, power loss increases.

Figure 9:
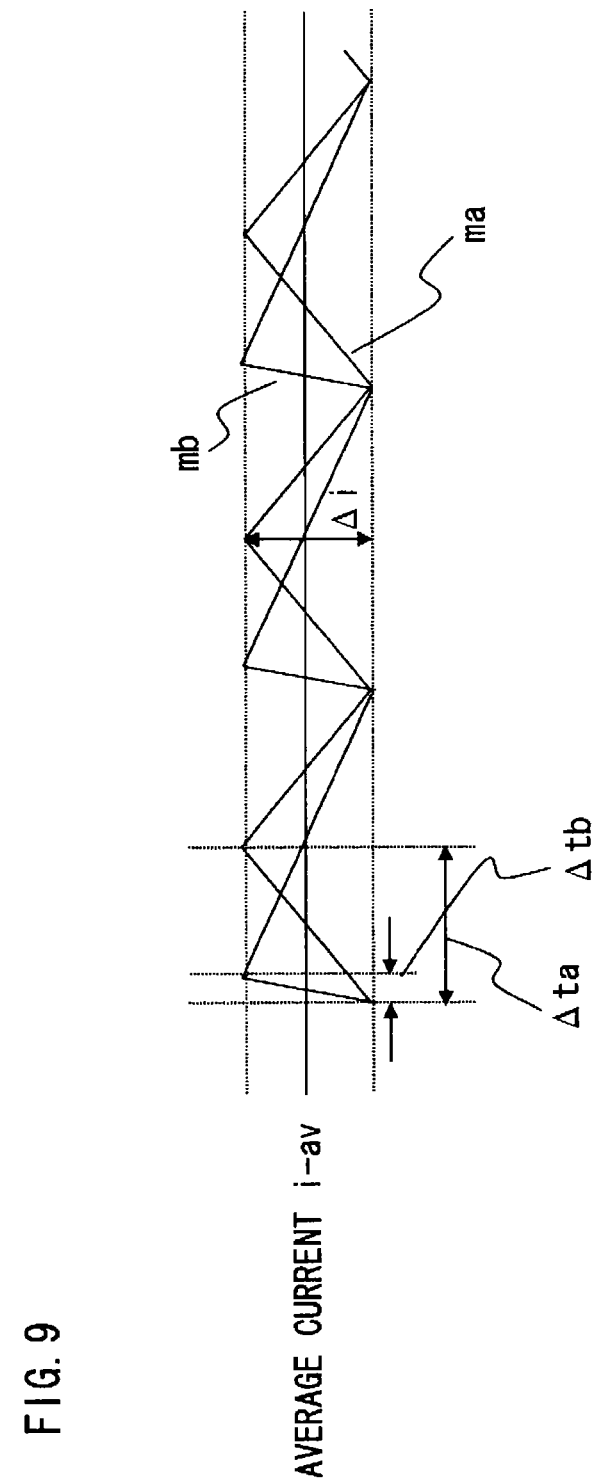
FIG. 9 shows a current waveform of a reactor for smoothing for illustrating the operation of the DC/DC converter section according to embodiment 1 of the present invention.

FIG. 9 is a diagram showing comparison between current waveforms of the reactor 14 for smoothing, depending on the difference in the duty ratio of the semiconductor switching devices 11a to 11d. As shown in FIG. 9, in order to obtain an average current i-av flowing in the reactor 14 for smoothing, in the case of using a current waveform ma in which a current mildly increases, an ON-time Δta of the semiconductor switching devices 11a to 11d is long so that the duty ratio is large. On the other hand, in the case of using a current waveform mb in which a current steeply increases, an ON-time Δtb of the semiconductor switching devices 11a to 11d is short so that the duty ratio is small.

From Expression (1), a current increase gradient $\Delta i/\Delta t$ of the reactor 14 for smoothing is a value obtained by dividing the voltage ($Vdc \cdot N_2/N_1 - Vout$) between both ends of the reactor 14 for smoothing by the inductance L of the reactor 14 for smoothing.

Therefore, if the voltage Vdc is assumed to be constant, when the output voltage Vout increases, $\Delta i/\Delta t$ decreases, and when the output voltage Vout decreases, $\Delta i/\Delta t$ increases. That is, when the output voltage Vout decreases, a current in the reactor 14 for smoothing steeply increases, and the duty ratio of the semiconductor switching devices 11a to 11d decreases. However, even if the output voltage Vout is low, by decreasing the voltage Vdc, the increase in the voltage ($Vdc \cdot N_2/N_1 - Vout$) between both ends of the reactor 14 for smoothing can be suppressed, so that $\Delta i/\Delta t$ will not increase.

In the present embodiment, the voltage Vdc of the smoothing capacitor 10 can be controlled in accordance with the output voltage Vout. That is, if the output voltage Vout is low, by decreasing the voltage Vdc, it is possible to always mildly increase the current in the reactor 14 for smoothing and to maintain the duty ratio of the semiconductor switching devices 11a to 11d to be large. For example, if the voltage ($Vdc \cdot N_2/N_1 - Vout$) between both ends of the reactor 14 for smoothing is controlled to be constant at an appropriate value, $\Delta i/\Delta t$ is also constant, and the current waveform of the reactor 14 for smoothing is also constant. As a result, for example, the current waveform ma having a large duty ratio as shown in FIG. 9 can be always obtained.

Next, a variable control method for the voltage Vdc of the smoothing capacitor 10 will be described.

Figure 8:
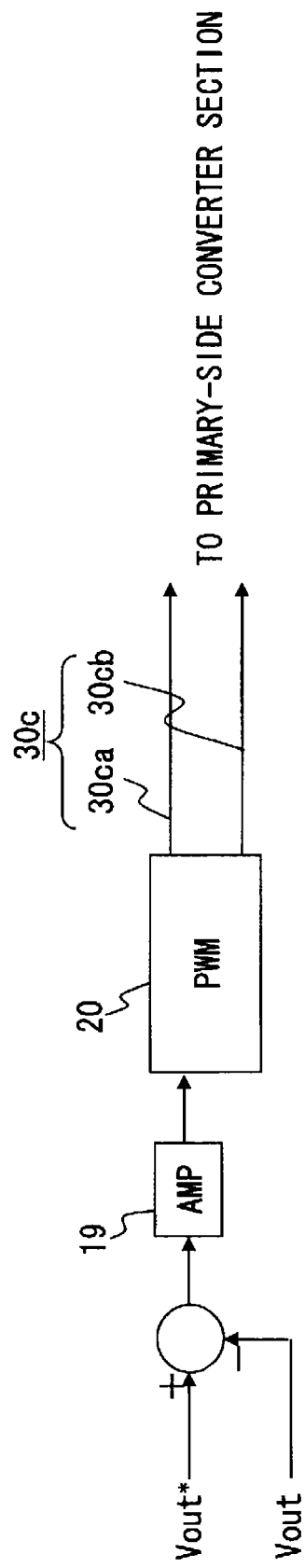
FIG. 8 is a control block diagram showing the control for the DC/DC converter section according to embodiment 1 of the present invention.
Figure 10:
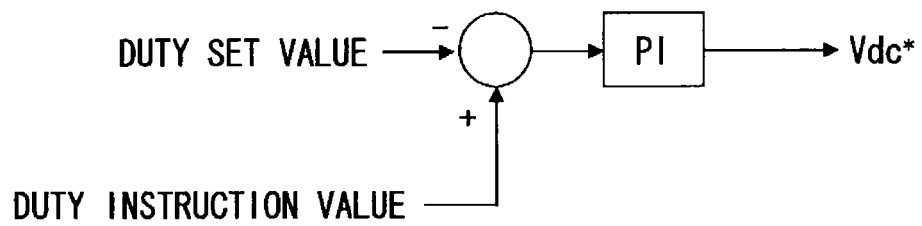
FIG. 10 is a control block diagram showing the control for a target voltage of a smoothing capacitor according to embodiment 1 of the present invention.

As shown in FIG. 8, the control circuit 16 generates the drive signal 30c as a duty instruction for the converter section 11 on the primary side of the transformer of the DC/DC converter section 200 such that the output voltage Vout follows the voltage instruction value Vout*. Then, as shown in FIG. 10, the control circuit 16 performs feedback control such that the difference between a predetermined duty set value and the generated duty instruction approaches zero, thereby generating the target voltage Vdc* of the smoothing capacitor 10. Then, as shown in FIG. 6(a), the control circuit 16 generates the current instruction Iin* such that the voltage Vdc of the smoothing capacitor 10 follows the target voltage Vdc*, thereby controlling the inverter circuit 300 of the high-power-factor converter section 100.

For example, in the case where the generated duty instruction is lower than the duty set value, a correction value by feedback control shown in FIG. 10 is negative, and therefore, the target voltage Vdc* of the smoothing capacitor 10 decreases. That is, the target voltage Vdc* in the control for the high-power-factor converter section 100 shown in FIG. 6(a) decreases. Then, when the voltage Vdc, which is the output voltage of the high-power-factor converter section 100 and also the input voltage of the DC/DC converter section 200, has decreased, the output voltage Vout of the DC/DC converter section 200 is to decrease. Then, as shown in FIG. 8, the duty instruction for the converter section 11 of the DC/DC converter section 200 increases. Thus, the duty instruction approaches the duty set value.

On the other hand, in the case where the generated duty instruction is higher than the duty set value, a correction value by feedback control shown in FIG. 10 is positive, and therefore, the target voltage Vdc* of the smoothing capacitor 10 increases. Then, when the target voltage Vdc* in the control for the high-power-factor converter section 100 shown in FIG. 6(a) has increased and the voltage Vdc has increased, the output voltage Vout of the DC/DC converter section 200 is to increase. Then, as shown in FIG. 8, the duty instruction for the converter section 11 of the DC/DC converter section 200 decreases. Thus, the duty instruction approaches the duty set value.

If the voltage instruction value Vout* increases, the duty instruction increases as shown in FIG. 8, but if the duty instruction becomes higher than the duty set value, the target voltage Vdc* of the smoothing capacitor 10 increases to suppress the duty instruction. On the other hand, if the voltage instruction value Vout* decreases, the target voltage Vdc* of the smoothing capacitor 10 decreases to suppress the decrease in the duty instruction. Since the output voltage Vout is controlled by the voltage instruction value Vout*, as described above, it is possible to realize control that adjusts the voltage Vdc to be low when the output voltage Vout is low, and to be high when the output voltage Vout is high.

As described above, in accordance with the output voltage Vout of the DC/DC converter section 200 which is a DC output to the load 2, the control circuit 16 adjusts the target voltage Vdc* of the smoothing capacitor 10 such that the duty ratio of the semiconductor switching devices 11a to 11d of the DC/DC converter section 200 approaches the duty set value, thereby controlling the high-power-factor converter section 100 and the DC/DC converter section 200.

As described above, if an optimum duty ratio that increases the period in which the transformer 12 transmits power from the primary side to the secondary side is used as the duty set value, the DC/DC converter section 200 can be operated in an optimum condition, and the flow-back time of a current on the primary side of the transformer 12, and the regeneration time of power can be reduced. Therefore, it becomes possible to reduce power loss and improve power conversion efficiency, thereby reducing the size of the apparatus.

In addition, since the current increase gradient of the reactor 14 for smoothing can be controlled to be substantially constant regardless of the magnitude of the output voltage Vout, it becomes possible to reduce the size of the reactor 14 for smoothing.

Figure 11:
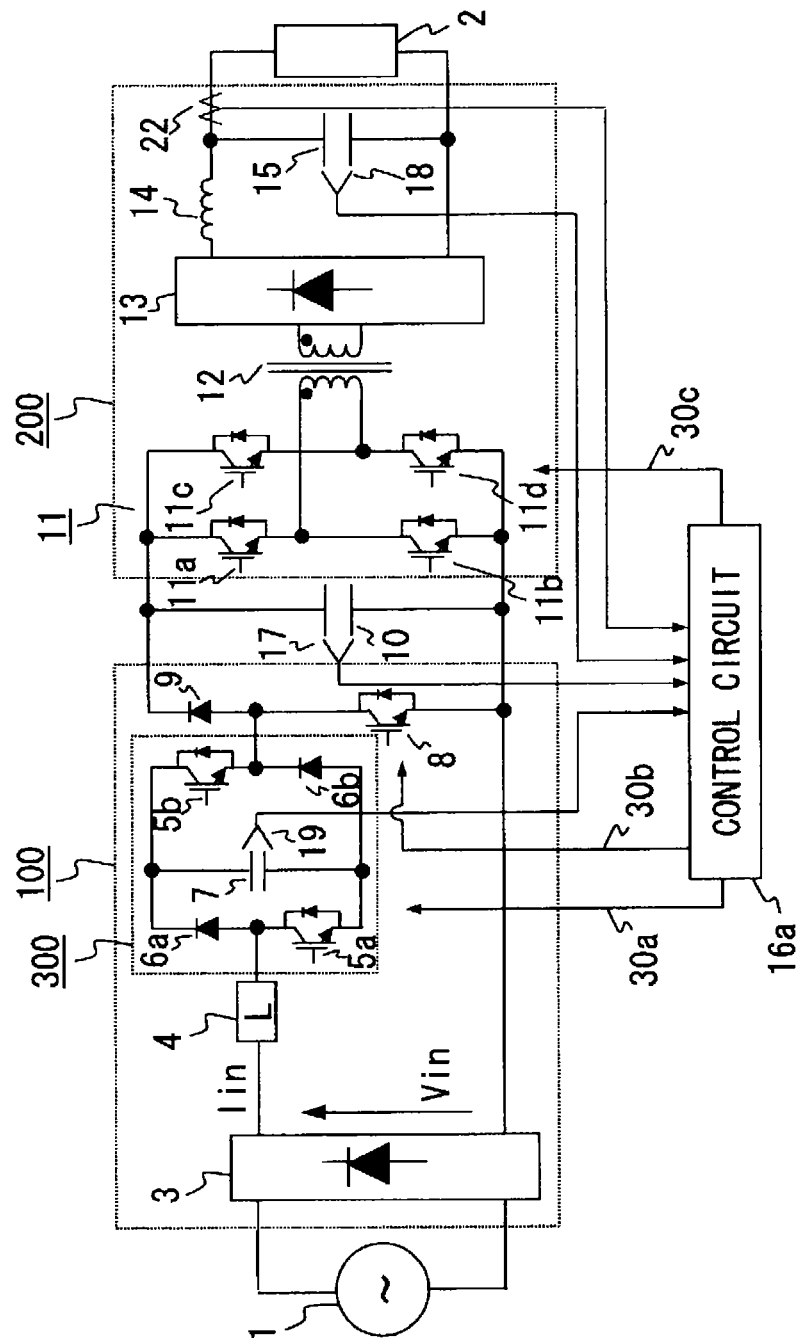
FIG. 11 is a configuration diagram of a power conversion apparatus according to another example of embodiment 1 of the present invention.
Figure 12:
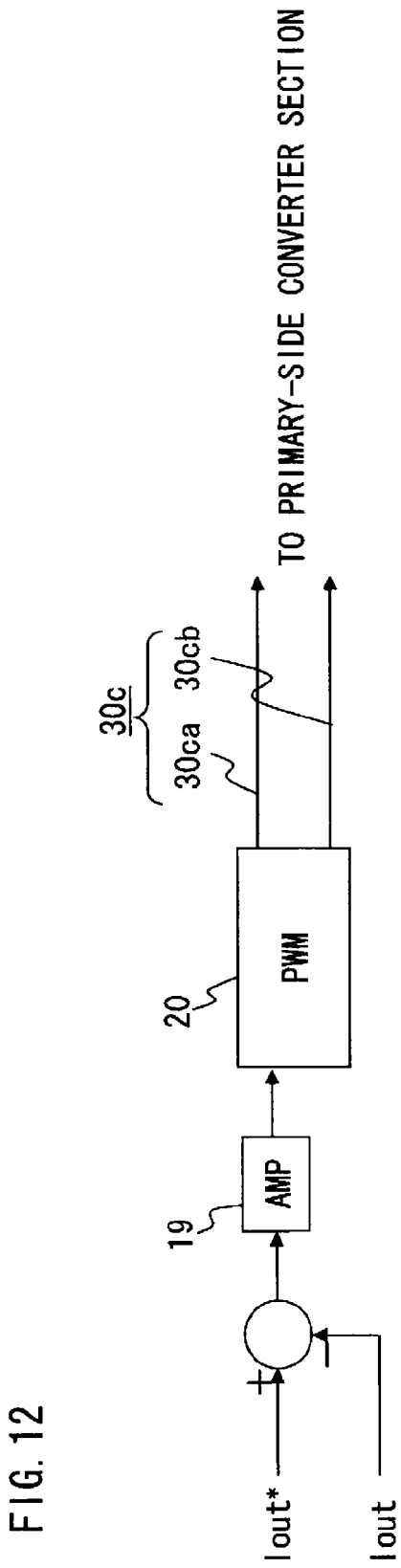
FIG. 12 is a control block diagram showing the control for a DC/DC converter section according to the other example of embodiment 1 of the present invention.

In the above embodiment 1, the DC output voltage Vout is controlled as a DC output to the load 2, but a DC output current Iout may be controlled. In this case, as shown in FIG. 11, a current sensor 22 is provided between the capacitor 15 for output smoothing and the load 2, thereby detecting the output current Iout as a DC output, and the detected value is inputted to a control circuit 16a as a control apparatus. At this time, as shown in FIG. 12, the control circuit 16a compares the output current Iout with the output current instruction value Iout*, amplifies the error by the error amplifying section 19, and outputs the drive signal 30c (30ca and 30cb) for driving the semiconductor switching devices 11a and 11d and the semiconductor switching devices 11b and 11c of the converter section 11 by the PWM control section 20. Thus, the output current Iout to the load 2 is controlled so as to approach the current instruction value Iout*.

The other operations of the control circuit 16a are the same as those of the control circuit 16 of the above embodiment 1. That is, in accordance with the output current Iout of the DC/DC converter section 200 as a DC output to the load 2, the target voltage Vdc* of the smoothing capacitor 10 is adjusted such that the duty ratio of the semiconductor switching devices 11a to 11d of the DC/DC converter section 200 approaches the duty set value, whereby the high-power-factor converter section 100 and the DC/DC converter section 200 are controlled. Thus, the same effect as in the above embodiment 1 can be provided.

The above embodiment has described that if the voltage instruction value Vout* increases, the target voltage Vdc* of the smoothing capacitor 10 increases, and if the voltage instruction value Vout* decreases, the target voltage Vdc* decreases. Here, the original target voltage Vdc* of the smoothing capacitor 10 when the voltage instruction value Vout* is to be changed may be set so as to optimize the duty ratio of the semiconductor switching devices 11a to 11d of the DC/DC converter section 200. Thus, the target voltage Vdc* of the smoothing capacitor 10 is first determined based on the voltage instruction value Vout* such that the duty ratio of the semiconductor switching devices 11a to 11d is optimized, that is, becomes the duty set value.

Also in this case, if the voltage instruction value Vout* increases, the target voltage Vdc* of the smoothing capacitor 10 increases, and if the voltage instruction value Vout* decreases, the target voltage Vdc* decreases. Thereafter, in accordance with the output voltage Vout of the DC/DC converter section 200, the target voltage Vdc* of the smoothing capacitor 10 is adjusted such that the duty ratio of the semiconductor switching devices 11a to 11d of the DC/DC converter section 200 approaches the duty set value, whereby the same control as in the above embodiment 1 is performed. Thus, the same effect as in the above embodiment 1 can be provided.

In this case, even if the control for adjusting the target voltage Vdc* of the smoothing capacitor 10 such that the duty ratio of the semiconductor switching devices 11a to 11d approaches the duty set value in accordance with the output voltage Vout is omitted, since the target voltage Vdc* is determined in accordance with the voltage instruction value Vout* so as to optimize the duty ratio of the semiconductor switching devices 11a to 11d, the effect of reducing power loss and reducing the size of the apparatus can be provided.

The semiconductor switching devices 5a and 5b and 11a to 11d which are self-turn-off semiconductor switching devices may be GCTs, GTOs, transistors, MOSFETs, or the like, instead of IGBTs. In the single-phase inverter of the inverter circuit 300, self-turn-off semiconductor switching devices may be used instead of the diodes 6a and 6b. Further, the inverter circuit 300 may have another circuit configuration.

Figure 13:
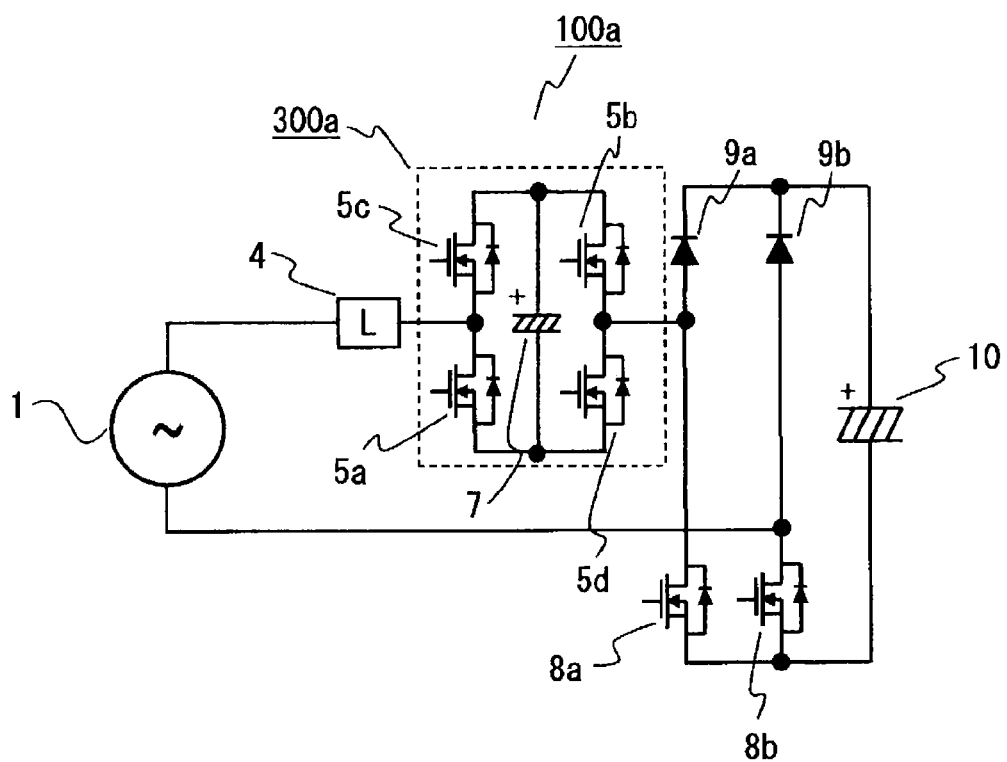
FIG. 13 is a configuration diagram of a high-power-factor converter section according to still another example of embodiment 1 of the present invention.

The configuration of the AC/DC converter section is not limited to the high-power-factor converter section 100. A high-power-factor converter section 100a having a configuration as shown in FIG. 13 may be used. In this case, an inverter circuit 300a composed of a single-phase inverter having the semiconductor switching devices 5a to 5d is connected to the AC voltage source 1 via the reactor 4, and a bridge circuit in which short-circuit switches 8a and 8b composed of semiconductor switching devices, and diodes 9a and 9b are connected in series, respectively, is provided at the subsequent stage of the inverter circuit 300a. It is noted that any high-power-factor converter that converts an AC voltage to a DC voltage may be applied to the high-power-factor converter section.

Also, the configuration of the DC/DC converter section 200 is not limited to the above-described one. The converter section 11 may have another circuit configuration such as a half-bridge converter, instead of the full-bridge converter circuit. In addition, also on the secondary side of the transformer 12, a rectification circuit other than the diode bridge 13 may be used.

Embodiment 2

Next, embodiment 2 of the present invention will be described.

Figure 14:
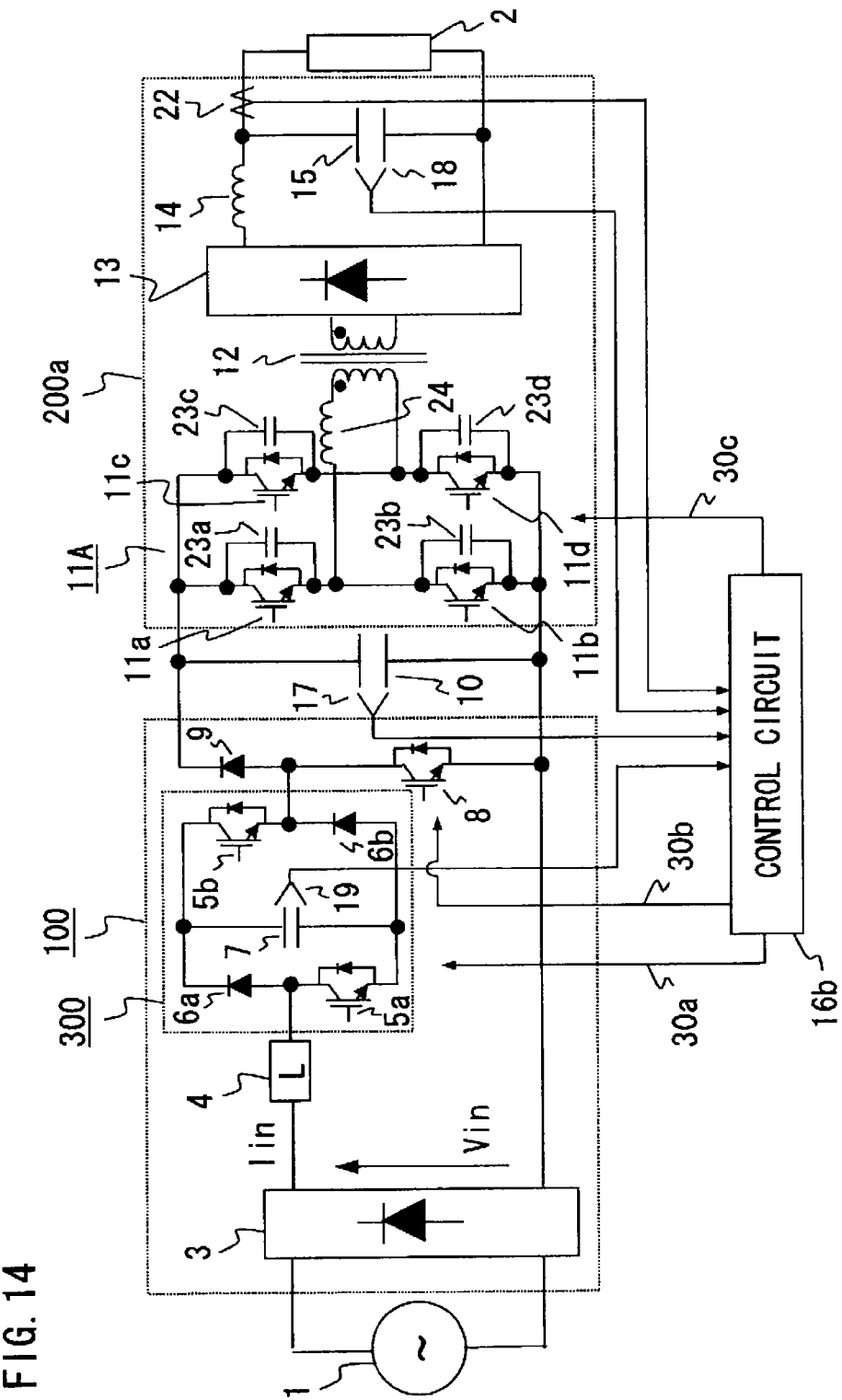
FIG. 14 is a configuration diagram of a power conversion apparatus according to embodiment 2 of the present invention.
Figure 15:
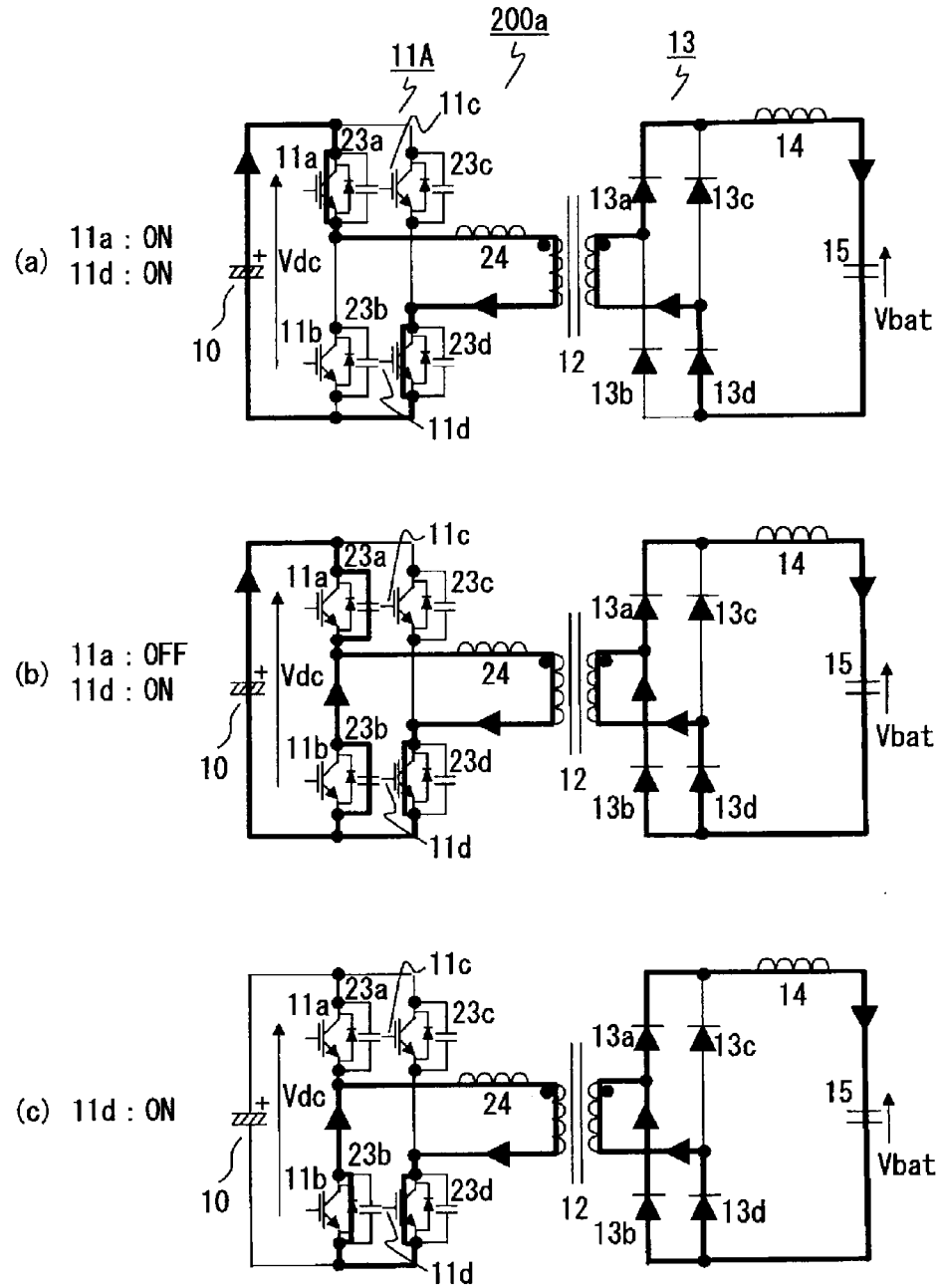
FIG. 15 is a diagram illustrating zero-voltage switching operation of a DC/DC converter section according to embodiment 2 of the present invention.
Figure 16:
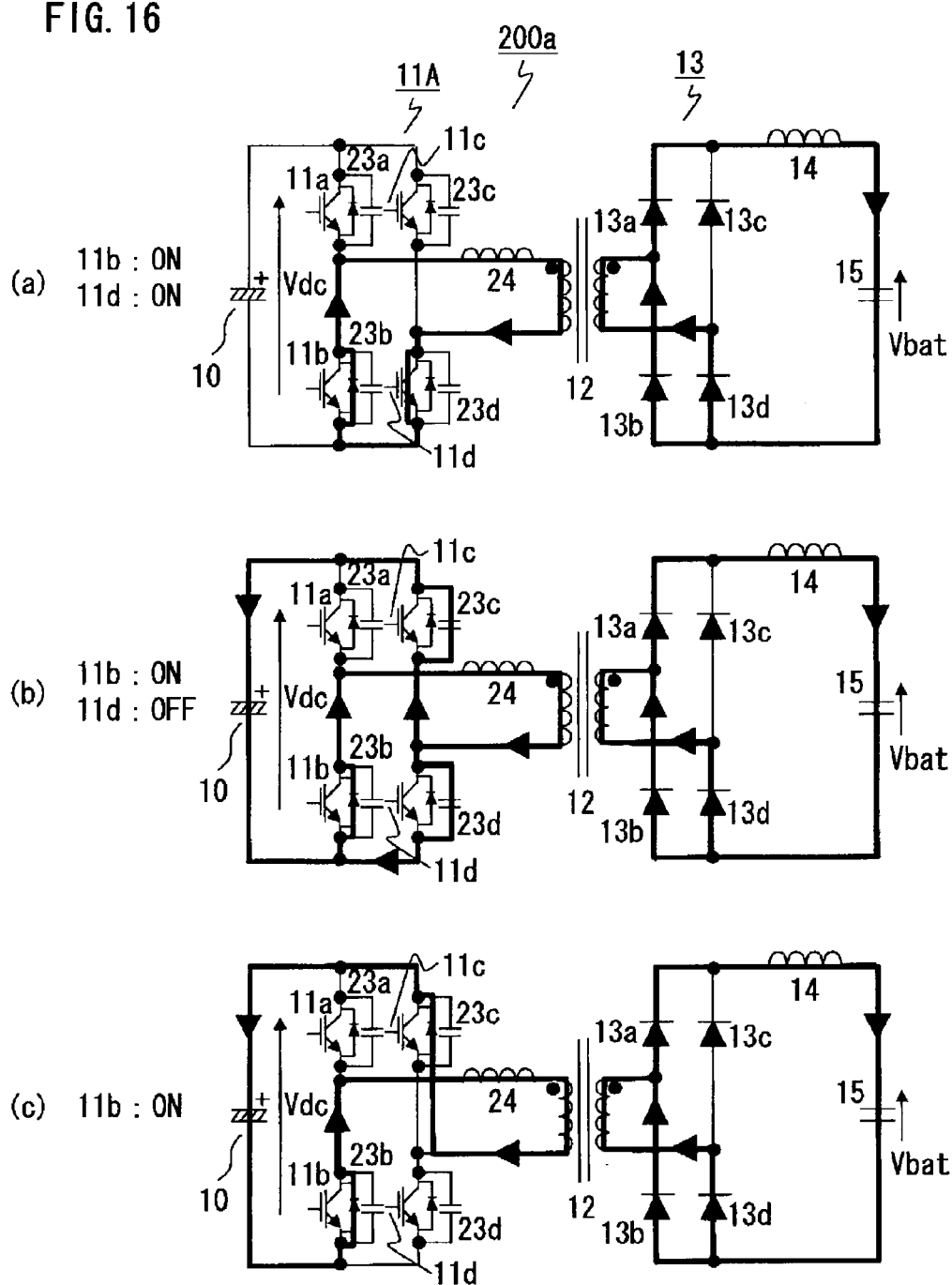
FIG. 16 is a diagram illustrating zero-voltage switching operation of the DC/DC converter section according to embodiment 2 of the present invention.
Figure 17:
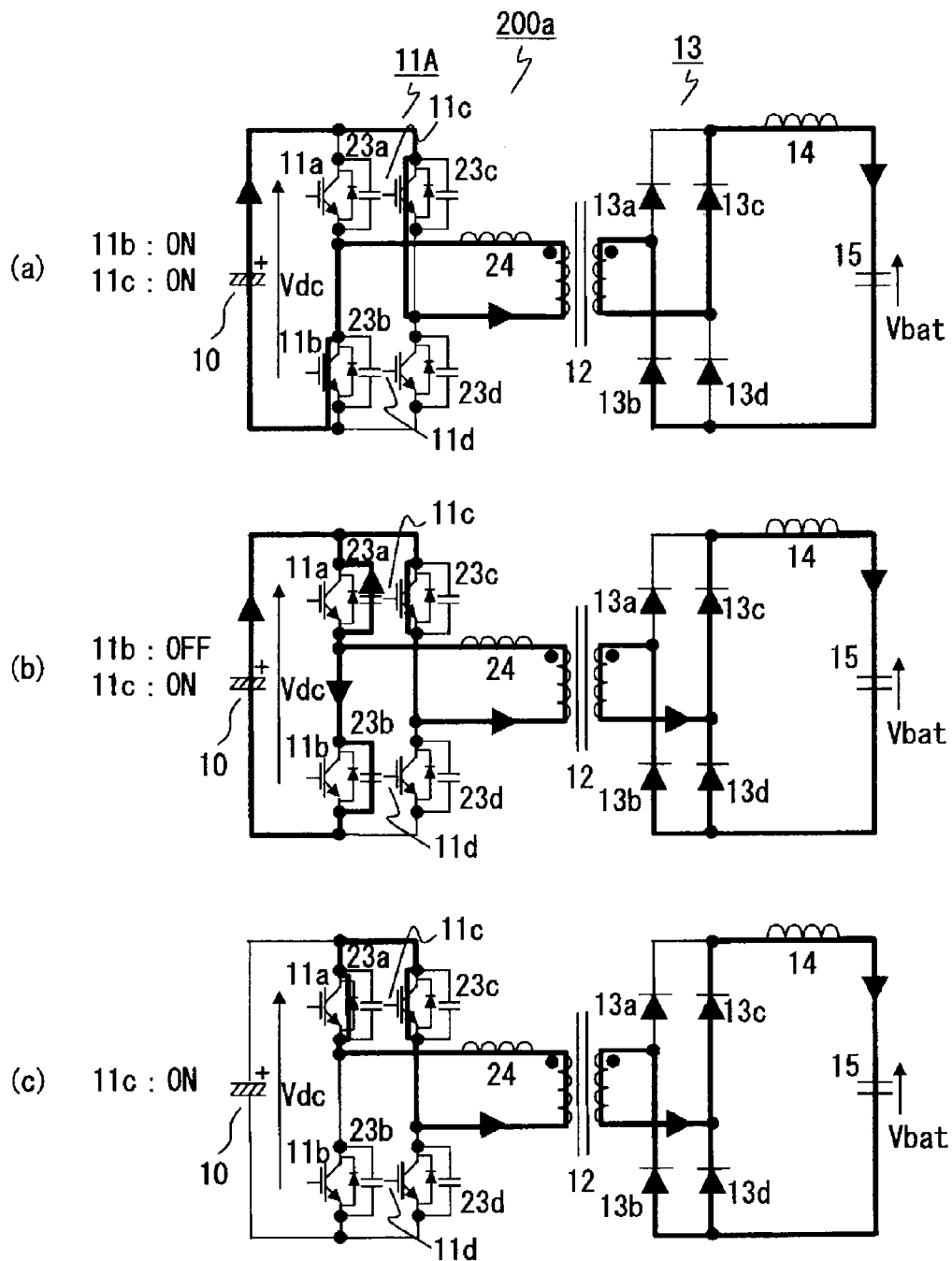
FIG. 17 is a diagram illustrating zero-voltage switching operation of the DC/DC converter section according to embodiment 2 of the present invention.
Figure 18:
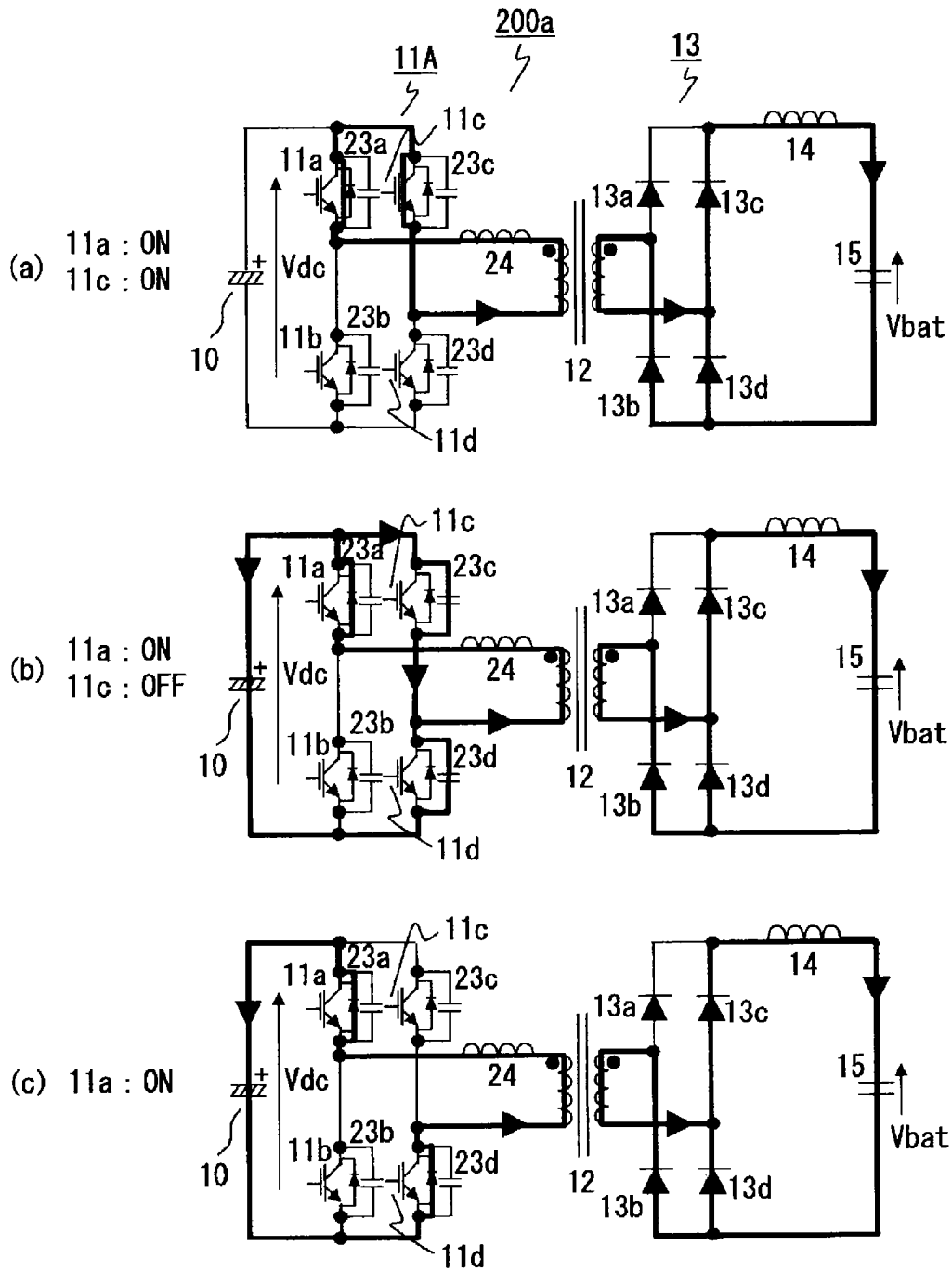
FIG. 18 is a diagram illustrating zero-voltage switching operation of the DC/DC converter section according to embodiment 2 of the present invention.

FIG. 14 is a diagram showing the circuit configuration of a power conversion apparatus according to embodiment 2 of the present invention. As shown in FIG. 14, a DC/DC converter section 200a includes, on the primary side of the transformer 12 that is insulated, a converter section 11A which is a full-bridge converter having the semiconductor switching devices 11a to 11d and which converts a DC voltage of the smoothing capacitor 10 to an AC voltage. The converter section 11A is a zero-voltage switching circuit that allows the voltage between both ends of each of the semiconductor switching devices 11a to 11d at the time of switching to be substantially zero. Capacitors 23a to 23d are connected in parallel to the semiconductor switching devices 11a to 11d, respectively. In addition, a reactor 24 is connected to an AC output line between the semiconductor switching devices 11a to 11d and the transformer 12.

A control circuit 16b as a control apparatus outputs the drive signals 30a and 30b for the semiconductor switching devices 5a and 5b and the short-circuit switch 8 in the high-power-factor converter section 100, and the drive signal 30c as a duty instruction for the semiconductor switching devices 11a to 11d in the DC/DC converter section 200. Here, the drive signal 30c for the semiconductor switching devices 11a to 11d is generated and outputted so as to allow the semiconductor switching devices 11a to 11d to perform zero-voltage switching. The other configurations are the same as those shown in FIG. 11 in the above embodiment 1.

First, the zero-voltage switching operation will be described. FIGS. 15 to 18 are diagrams illustrating the operation of the DC/DC converter section 200a, and show the current routes in the DC/DC converter section 200a at each phase of the variation in the switching states of the semiconductor switching devices 11a to 11d. It is noted that the diode bridge 13 is shown as diodes 13a to 13d in the drawings.

As shown in FIG. 15(a), when the semiconductor switching devices 11a and 11d are ON, a current flows on the primary side of the transformer 12 through a route of the smoothing capacitor 10→the semiconductor switching device 11a→the reactor 24→the transformer 12→the semiconductor switching device 11d→the smoothing capacitor 10. At this time, a current flows on the secondary side of the transformer 12 through a route of the transformer 12→the diode 13a→the reactor 14→the capacitor 15→the diode 13d→the transformer 12, whereby power is transmitted from the primary side to the secondary side of the transformer 12.

Next, as shown in FIG. 15(b), when the semiconductor switching device 11a has been turned off, a current flows on the primary side of the transformer through a route of the reactor 24→the transformer 12→the semiconductor switching device 11d→the smoothing capacitor 10→the capacitor 23a→the reactor 24, and a route of the reactor 24→the transformer 12→the semiconductor switching device 11d→the capacitor 23b→the reactor 24. At this time, the increase in the voltage between both ends of the semiconductor switching device 11a is delayed by effect of the capacitor 23a, whereby a current is interrupted before the voltage increases. Such switching is generally referred to as zero-voltage switching, which reduces switching loss to substantially zero.

In addition, since the sum of the voltages of the capacitor 23a and the capacitor 23b is equal to the voltage of the smoothing capacitor 10, the increase in the voltage between both ends of the capacitor 23a is substantially equal to the decrease in the voltage between both ends of the capacitor 23b. At this time, a current flows on the secondary side of the transformer 12, by the energy of the reactor 14, through a route of the reactor 14→the capacitor 15→the diode 13b→the diode 13a→the reactor 14, or a route of the reactor 14→the capacitor 15→the diode 13d→the transformer 12→the diode 13a→the reactor 14. The state shown in FIG. 15(b) continues until the voltage of the capacitor 23a becomes substantially equal to the voltage of the smoothing capacitor 10 and the voltage of the capacitor 23b becomes substantially zero.

Next, when the voltage of the capacitor 23a has become substantially equal to the voltage of the capacitor 10 and the voltage of the capacitor 23b has become substantially zero, as shown in FIG. 15(c), a current flows on the primary side of the transformer 12 through a route of the reactor 24→the transformer 12→the semiconductor switching device 11d→the antiparallel diode of the semiconductor switching device 11b→the reactor 24.

Next, as shown in FIG. 16(a), when the semiconductor switching device 11b has been turned on so that the semiconductor switching devices 11b and 11d have become ON, if the semiconductor switching devices 11a to 11d are devices such as IGBTs that do not allow a current to flow in an opposite direction, the current flowing route does not change from the case of FIG. 15(c). At this time, the voltage between both ends of the semiconductor switching device 11b (the voltage of the capacitor 23b) is substantially zero, that is, zero-voltage switching is performed, whereby switching loss of the semiconductor switching device 11b is substantially zero.

Next, as shown in FIG. 16(b), when the semiconductor switching device 11d has been turned off, a current flows on the primary side of the transformer 12 through a route of the reactor 24→the transformer 12→the capacitor 23d the antiparallel diode of the semiconductor switching device 11b→the reactor 24, and a route of the reactor 24→the transformer 12→the capacitor 23c→the smoothing capacitor 10→the antiparallel diode of the semiconductor switching device 11b→the reactor 24. At this time, in the semiconductor switching device 11d, a current is interrupted before the voltage between both ends thereof increases, by effect of the capacitor 23d, whereby zero-voltage switching is performed. Then, a current flows in the state shown in FIG. 16(b) until the voltage of the capacitor 23c decreases to substantially zero and the voltage of the capacitor 23d becomes substantially equal to the voltage of the smoothing capacitor 10.

Next, when the voltage of the capacitor 23c has decreased to substantially zero and the voltage of the capacitor 23d has become substantially equal to the voltage of the smoothing capacitor 10, as shown in FIG. 16(c), a current flows on the primary side of the transformer 12 through a route of the reactor 24→the transformer 12→the antiparallel diode of the semiconductor switching device 11c→the smoothing capacitor 10→the antiparallel diode of the semiconductor switching device 11b→the reactor 24.

Next, as shown in FIG. 17(a), when the semiconductor switching device 11c has been turned on so that the semiconductor switching devices 11b and 11c have become ON, a voltage in the opposite direction is applied to the transformer 12 and the reactor 24, and a current flows on the primary side of the transformer 12 through a route of the smoothing capacitor 10→the semiconductor switching device 11c→the transformer 12→the reactor 24→the semiconductor switching device 11b→the smoothing capacitor 10. At this time, a current flows on the secondary side of the transformer 12 through a route of the transformer 12→the diode 13c→the reactor 14→the capacitor 15→the diode 13b→the the transformer 12, whereby power is transmitted from the primary side to the secondary side of the transformer 12. At this time, the semiconductor switching device 11c is turned on with the voltage between both ends thereof being substantially zero, that is, zero-voltage switching is performed. Therefore, switching loss hardly occurs.

Next, as shown in FIG. 17(b), when the semiconductor switching device 11b has been turned off, a current flows on the primary side of the transformer through a route of the reactor 24→the capacitor 23b→the smoothing capacitor 10→the semiconductor switching device 11c→the transformer 12→the reactor 24, and a route of the reactor 24→the capacitor 23a→the semiconductor switching device 11c→the transformer 12→the reactor 24. At this time, in the semiconductor switching device 11b, a current is interrupted before the voltage between both ends thereof increases, by effect of the capacitor 23b, whereby zero-voltage switching is performed.

In addition, at this time, a current flows on the secondary side of the transformer 12, by the energy of the reactor 14, through a route of the reactor 14→the capacitor 15→the diode 13d→the diode 13c→the reactor 14, or a route of the reactor 14→the capacitor 15→the diode 13b→the transformer 12→the diode 13c→the reactor 14. Then, a current flows in the state shown in FIG. 17(b) until the voltage of the capacitor 23a decreases to substantially zero and the voltage of the capacitor 23b becomes substantially equal to the voltage of the smoothing capacitor 10.

Next, when the voltage of the capacitor 23a has decreased to substantially zero and the voltage of the capacitor 23b has become substantially equal to the voltage of the smoothing capacitor 10, as shown in FIG. 17(c), a current flows on the primary side of the transformer 12 through a route of the reactor 24→the antiparallel diode of the semiconductor switching device 11a→the semiconductor switching device 11c→the transformer 12→the reactor 24.

Next, as shown in FIG. 18(a), when the semiconductor switching device 11a has been turned on so that the semiconductor switching devices 11a and 11c have become ON, the current flowing route does not change from the case of FIG. 17(c). At this time, the voltage between both ends of the semiconductor switching device 11a (the voltage of the capacitor 23a) is substantially zero, that is, zero-voltage switching is performed, whereby switching loss of the semiconductor switching device 11a is substantially zero.

Next, as shown in FIG. 18(b), when the semiconductor switching device 11c has been turned off, a current flows on the primary side of the transformer 12 through a route of the reactor 24→the antiparallel diode of the semiconductor switching device 11a→the capacitor 23c→the transformer 12→the reactor 24, and a route of the reactor 24→the antiparallel diode of the semiconductor switching device 11a→the smoothing capacitor 10→the capacitor 23d→the transformer 12→the reactor 24. At this time, in the semiconductor switching device 11c, a current is interrupted before the voltage between both ends thereof increases, by effect of the capacitor 23c, whereby zero-voltage switching is performed. Then, a current flows in the state shown in FIG. 18(b) until the voltage of the capacitor 23d decreases to substantially zero and the voltage of the capacitor 23c becomes substantially equal to the voltage of the smoothing capacitor 10.

Next, when the voltage of the capacitor 23d has decreased to substantially zero and the voltage of the capacitor 23c has become substantially equal to the voltage of the smoothing capacitor 10, as shown in FIG. 18(c), a current flows on the primary side of the transformer 12 through a route of the reactor 24→the antiparallel diode of the semiconductor switching device 11a→the smoothing capacitor 10→the antiparallel diode of the semiconductor switching device 11d→the transformer 12→the reactor 24. Then, the semiconductor switching device 11d is turned on, and the state returns to that of FIG. 15(a).

A condition for the above-described zero-voltage switching of the semiconductor switching devices 11a to 11d will be described below.

In zero-voltage switching of each of the semiconductor switching devices 11a to 11d, the capacitors 23a to 23d connected in parallel to the semiconductor switching devices 11a to 11d respectively exert effects. The condition for realizing the zero-voltage switching of the semiconductor switching devices 11a to 11d is that the voltages of the capacitors 23a to 23d increase to the voltage of the smoothing capacitor 10 or decrease to be close to zero during the dead time of switching.

Since the voltages of the capacitors 23a to 23d vary in accordance with the current in the reactor 24, if the output power of the DC/DC converter section 200a is small, that is, if the current in the reactor 24 decreases, there is a possibility that the above realization condition is not satisfied and the zero-voltage switching of the semiconductor switching devices 11a to 11d cannot be performed.

Therefore, in order that each of the semiconductor switching devices 11a to 11d can satisfy the above realization condition to perform zero-voltage switching, the target voltage Vdc* of the smoothing capacitor 10 is changed in accordance with the current in the reactor 24. That is, if the current in the reactor 24 is small so that the zero-voltage switching cannot be performed, the target voltage Vdc* of the smoothing capacitor 10 is decreased. In the case where the output power of the DC/DC converter section 200a is the same value, if the target voltage Vdc* of the smoothing capacitor 10 is decreased to decrease the voltage Vdc so that the output voltage Vout has decreased, the current in the reactor 24 increases by the amount corresponding to said decrease. As a result, since the voltage variations in the capacitors 23a to 23d during the dead time of the switching of the semiconductor switching devices 11a to 11d become large, zero-voltage switching becomes easy to be realized. In addition, also by decrease in the voltage of the smoothing capacitor 10, zero-voltage switching becomes easy to be realized.

Also in the present embodiment, as in the above embodiment 1, the control circuit 16b controls the high-power-factor converter section 100 as shown in FIGS. 6(a) and 6(b). In addition, as shown in FIG. 8 or 12, the control circuit 16b performs duty control for the semiconductor switching devices 11a to 11d such that the output voltage Vout or the output current Iout as a DC output follows an instruction value, thereby controlling the DC/DC converter section 200a. At this time, the semiconductor switching devices 11a to 11d are caused to perform switching operations as shown in FIGS. 15 to 18. Then, the target voltage Vdc* of the smoothing capacitor 10 is adjusted, whereby zero-voltage switching of the semiconductor switching devices 11a to 11d is enabled.

Thus, it becomes possible to significantly decrease the switching loss of the semiconductor switching devices 11a to 11d in the DC/DC converter section 200a, thereby reducing the power loss of the power conversion apparatus and improving the power conversion efficiency.

It is noted that a leakage inductance of the transformer 12 may be used to serve as the reactor 24 connected to the AC output line of the converter section 11 on the primary side of the transformer 12.

In the case where the semiconductor switching devices 11a to 11d are composed of MOSFETs, synchronized rectification operation which does not allow a current to pass through the antiparallel diode may be performed.

Figure 19:
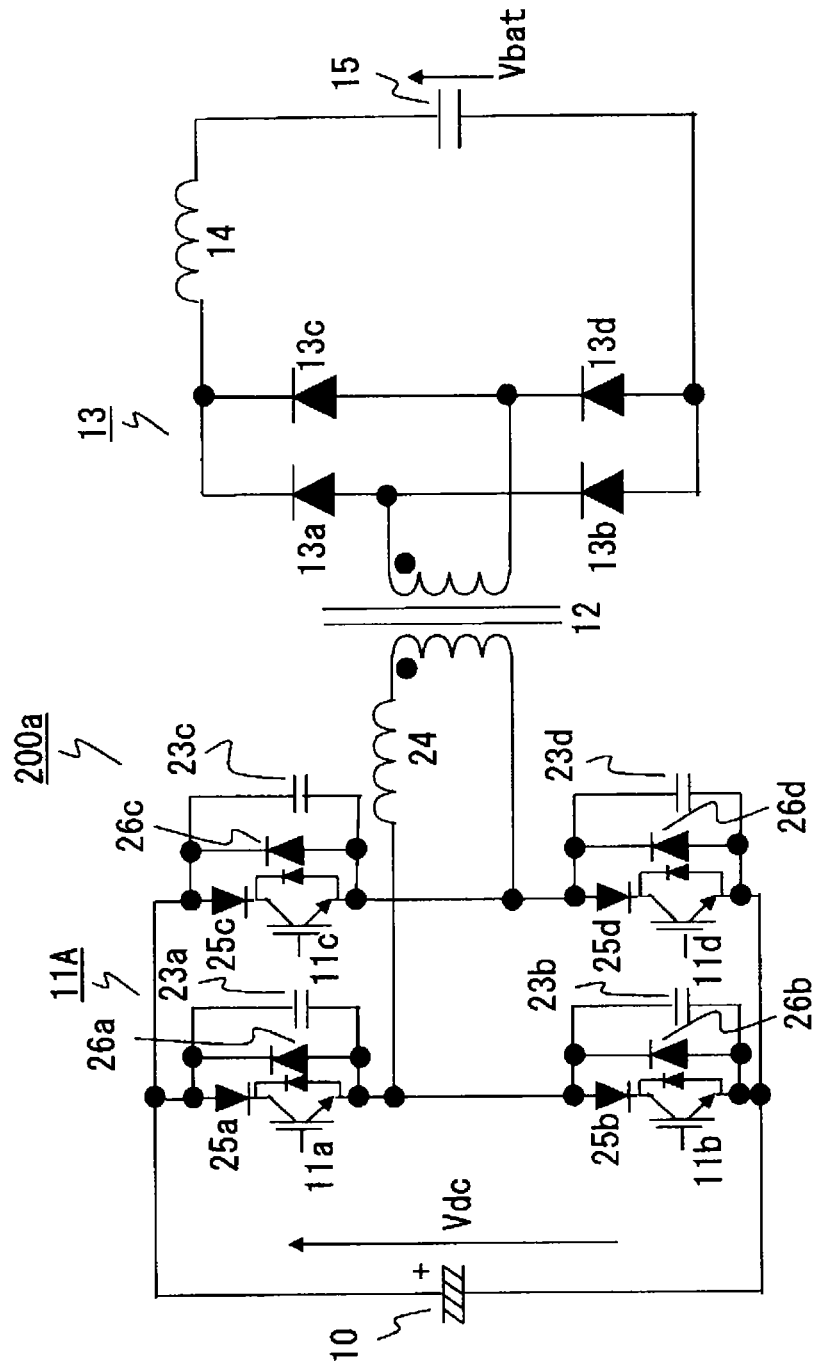
FIG. 19 is a configuration diagram of a DC/DC converter section according to another example of embodiment 2 of the present invention.

The DC/DC converter section 200a may have a circuit configuration as shown in FIG. 19. As shown in FIG. 19, in the converter section 11A of the DC/DC converter section 200a, diodes 25a to 25d for preventing reverse conduction are connected in series to the semiconductor switching devices 11a to 11d, respectively, and antiparallel diodes 26a to 26d are connected in parallel to the respective series circuits composed of the semiconductor switching devices 11a to 11d and the diodes 25a to 25d for preventing reverse conduction. In this case, only a forward current is applied to the semiconductor switching devices 11a to 11d, and a reverse current is applied to the antiparallel diodes 26a to 26d. The other configurations are the same as those shown in FIG. 14 in the above embodiment 2.

In the power conversion apparatus having the circuit configuration described in the present embodiment, the control described in the above embodiment 1 may be performed, and at this time, the semiconductor switching devices 11a to 11d may be caused to perform switching operations as shown in FIGS. 15 to 18, whereby zero-voltage switching of the semiconductor switching devices 11a to 11d may be performed. In this case, in accordance with the DC output of the DC/DC converter section 200a, the target voltage Vdc* of the smoothing capacitor 10 is adjusted such that the duty ratio of the semiconductor switching devices 11a to 11d approaches the duty set value. As described above, since the duty set value is set at a relatively large value of duty ratio, the target voltage Vdc* of the smoothing capacitor 10 is suppressed to be relatively low. Therefore, the current in the reactor 24 can be maintained at a relatively high value, whereby zero-voltage switching of the semiconductor switching devices 11a to 11d can be realized. In this case, the same effect as in the above embodiment 1 can be provided, and further, it becomes possible to significantly decrease the switching loss of the semiconductor switching devices 11a to 11d, thereby further improving the power conversion efficiency.

Embodiment 3

In the above embodiment 2, zero-voltage switching of the semiconductor switching devices 11a to 11d is performed, thereby reducing switching loss to substantially zero. In embodiment 3, instead of using a voltage that is absolutely zero, a minute voltage is permitted, to perform switching of the semiconductor switching devices 11a to 11d. It is noted that the circuit configuration of the power conversion apparatus is the same as that of the above embodiment 2 (see FIGS. 14 and 19).

Figure 20:
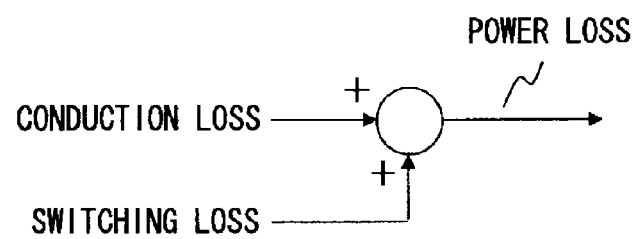
FIG. 20 is a diagram illustrating power loss of a DC/DC converter section according to embodiment 3 of the present invention.

FIG. 20 is a diagram illustrating power loss in the semiconductor switching devices 11a to 11d of the DC/DC converter section 200a according to embodiment 3. As shown in FIG. 20, the power loss that is the sum of switching loss at the time of switching and conduction loss at the time of conduction occurs in the semiconductor switching devices 11a to 11d.

When the output power of the DC/DC converter section 200a is small, a current flowing in the reactor 24 becomes small. Therefore, for example, after the semiconductor switching device 11a has been turned from on to off, if the voltage of the capacitor 23b does not completely decrease to zero until the semiconductor switching device 11b is turned on after switching dead time, energy corresponding to the remaining voltage of the capacitor 23b is switching loss of the semiconductor switching device 11b.

As described above, if the DC voltage Vdc of the smoothing capacitor 10 is decreased to increase a current flowing in the reactor 24, it is possible to realize the operation that allows the voltage of the capacitor 23b to become zero during the switching dead time between the semiconductor switching device 11a and the semiconductor switching device 11b. At this time, zero-voltage switching is performed in the semiconductor switching devices 11a to 11d, and therefore, switching loss is substantially zero. However, since a current flowing in the reactor 24, that is, a current flowing in the semiconductor switching devices 11a to 11d increases, conduction loss of the semiconductor switching devices 11a to 11d increases.

Accordingly, in embodiment 3, the target voltage Vdc* of the smoothing capacitor 10 is adjusted so as to decrease power loss which is the sum of the conduction loss and the switching loss of the semiconductor switching devices 11a to 11d. For this adjustment, the voltage Vdc of the smoothing capacitor 10 that minimizes the power loss of the semiconductor switching devices 11a to 11d may be obtained in advance, and the voltage value may be used as the target voltage Vdc*.

Thus, although the switching of the semiconductor switching devices 11a to 11d is not perfect zero-voltage switching, conduction loss of the semiconductor switching devices 11a to 11d can be reduced, and power loss which is the sum of conduction loss and switching loss can be further reduced. Therefore, it is possible to realize a power conversion apparatus having decreased loss.

It is noted that the target voltage Vdc* may be set such that power loss of the semiconductor switching devices 11a to 11d is equal to or smaller than a predetermined value set in advance. For example, if a value corresponding to conduction loss at the time of zero-voltage switching is used as the predetermined value set in advance, the power loss which is the sum of the conduction loss and the switching loss can be reduced.

Figure 21:
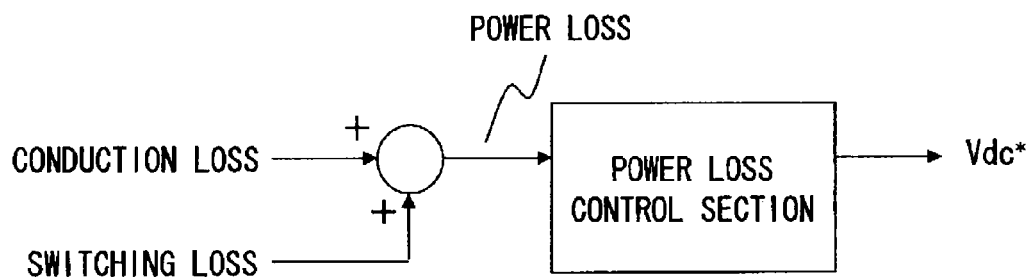
FIG. 21 is a control block diagram showing the control for a target voltage of a smoothing capacitor according to embodiment 3 of the present invention.

As shown in FIG. 21, a power loss control section may be provided in the control circuit 16b. In this case, in the control circuit 16b, the power loss which is the sum of the conduction loss and the switching loss of the semiconductor switching devices 11a to 11d is calculated, and the power loss control section adjusts the target voltage Vdc* of the smoothing capacitor 10 so as to decrease the power loss.

Embodiment 4

Next, embodiment 4 of the present invention will be described.

Figure 22:
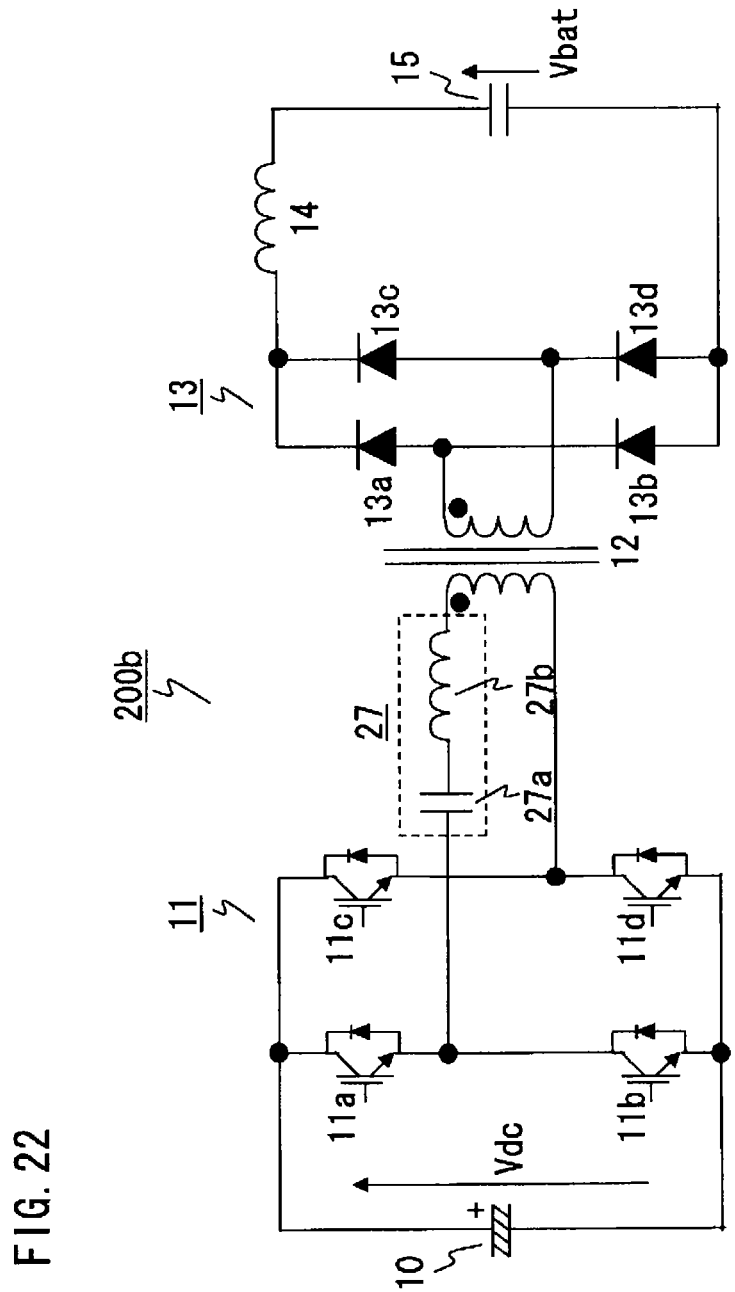
FIG. 22 is a configuration diagram of a DC/DC converter section according to embodiment 4 of the present invention.

FIG. 22 is a diagram showing the circuit configuration of a DC/DC converter section 200b of a power conversion apparatus according to embodiment 4 of the present invention. As shown in FIG. 22, the DC/DC converter section 200b includes, on the primary side of the transformer 12 that is insulated, the converter section 11 which is a full-bridge converter having the semiconductor switching devices 11a to 11d and which converts a DC voltage of the smoothing capacitor 10 to an AC voltage. The converter section 11 is a zero-current switching circuit that allows a current flowing in each of the semiconductor switching devices 11a to 11d at the time of switching to be substantially zero. A series circuit 27 (hereinafter, referred to as an LC resonance circuit 27) composed of a reactor 27a and a capacitor 27b is connected to an AC output line between the semiconductor switching devices 11a to 11d and the transformer 12. The other configurations are the same as those shown in FIG. 11 in the above embodiment 1.

First, zero-current switching operation will be described with reference to a waveform diagram of each section shown in FIG. 23.

Figure 23:
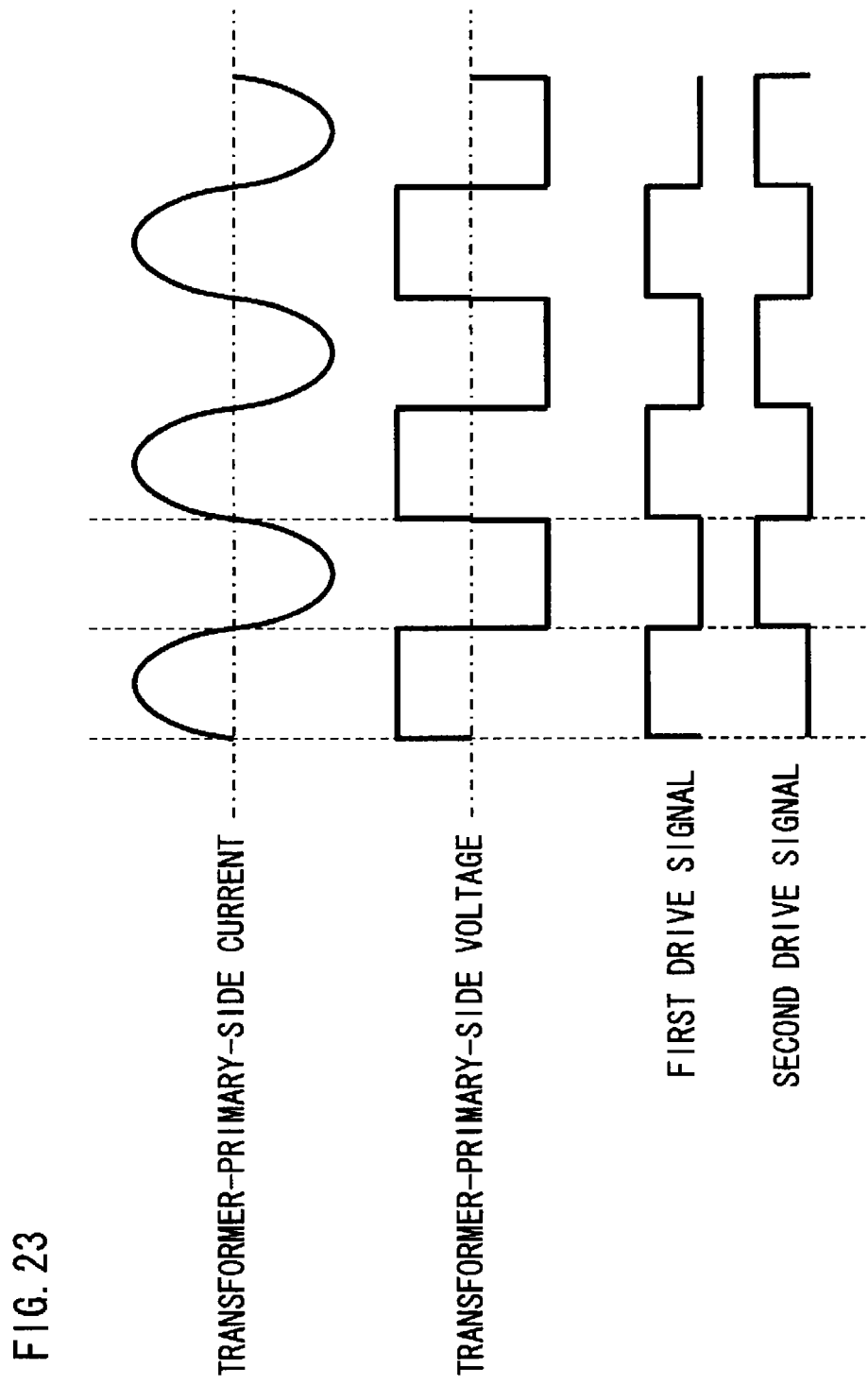
FIG. 23 is a waveform diagram illustrating zero-current switching operation of the DC/DC converter section according to embodiment 4 of the present invention.

When the semiconductor switching devices 11a and 11d are both ON, and when the semiconductor switching devices 11b and 11c are both ON, a current of sine wave as shown in FIG. 23 flows on the primary side of the transformer 12, owing to LC resonance effect of the LC resonance circuit 27. The ON/OFF timings of the semiconductor switching devices 11a and 11d and the semiconductor switching devices 11b and 11c are synchronized with the zero cross phase of the current wave, whereby zero-current switching can be realized. After a positive current flows while the semiconductor switching devices 11a and 11d are both ON, the semiconductor switching devices 11a and 11d are turned from on to off, and then the semiconductor switching devices 11b and 11c are turned on. Then, this time, a negative current flows.

Also in the present embodiment, as in the above embodiment 1, the control circuit 16 controls the high-power-factor converter section 100 as shown in FIGS. 6(a) and 6(b). In addition, as shown in FIG. 8 or 12, the control circuit 16 outputs the drive signal 30c (30ca and 30cb) as the duty instruction for driving the semiconductor switching devices 11a and 11d and the semiconductor switching devices 11b and 11c such that the output voltage Vout or the output current Iout as a DC output follows an instruction value, thereby controlling the DC/DC converter section 200a. Then, as shown in FIG. 10, the control circuit 16 performs feedback control such that the difference between a predetermined duty set value and the generated duty instruction approaches zero, thereby adjusting the target voltage Vdc* of the smoothing capacitor 10. It is noted that in FIG. 23, a first drive signal is the drive signal 30ca for the semiconductor switching devices 11a and 11d, and a second drive signal is the drive signal 30cb for the semiconductor switching devices 11b and 11c. In addition, the duty set value in this case is a value that can realize zero-current switching of the semiconductor switching devices 11a to 11d.

Figure 24:
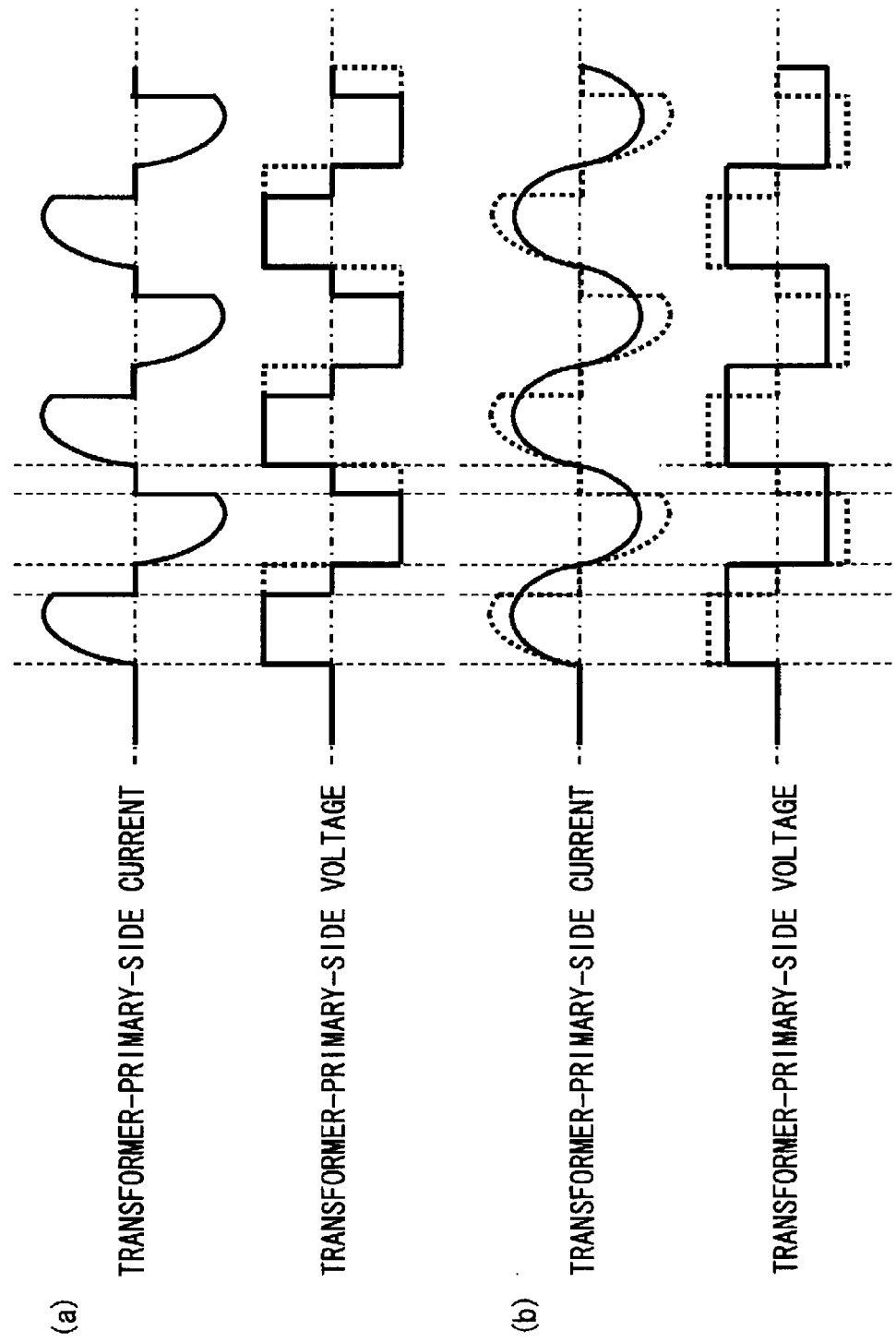
FIG. 24 is a waveform diagram illustrating the control for the DC/DC converter section according to embodiment 4 of the present invention.

In zero-current switching of the semiconductor switching devices 11a to 11d, the switching frequency and the output voltage are determined by the turns ratio of the transformer 12 and the constant of the LC resonance circuit 27. For changing the output voltage, as shown in FIG. 24(a), if the ON-time, that is, the duty ratio of each of the semiconductor switching devices 11a to 11d is changed to decrease the output voltage, the switching timing of each of the semiconductor switching devices 11a to 11d shifts from the current zero point. As a result, zero-current switching is not realized.

In the present embodiment, the duty set value is determined so as to realize the zero-current switching, and the target voltage Vdc* of the smoothing capacitor 10 is adjusted in accordance with the DC output to the load 2. Thus, as shown in FIG. 24(b), it becomes possible to reduce the output voltage while realizing zero-current switching.

Therefore, since the output voltage can be made variable while zero-current switching of the semiconductor switching devices 11a to 11d is maintained, it is possible to significantly reduce switching loss, thereby reducing power loss of the power conversion apparatus and improving the power conversion efficiency.

It is noted that such switching as described in the above embodiments 2 to 4 that makes loss of switching of the semiconductor switching devices 11a to 11d substantially zero or very small, is referred to as soft switching. In the above embodiments 2 to 4, the target voltage Vdc* of the smoothing capacitor 10 is adjusted so as to allow the semiconductor switching devices 11a to 11d to perform soft switching.

Embodiment 5

Next, embodiment 5 of the present invention will be described.

Figure 25:
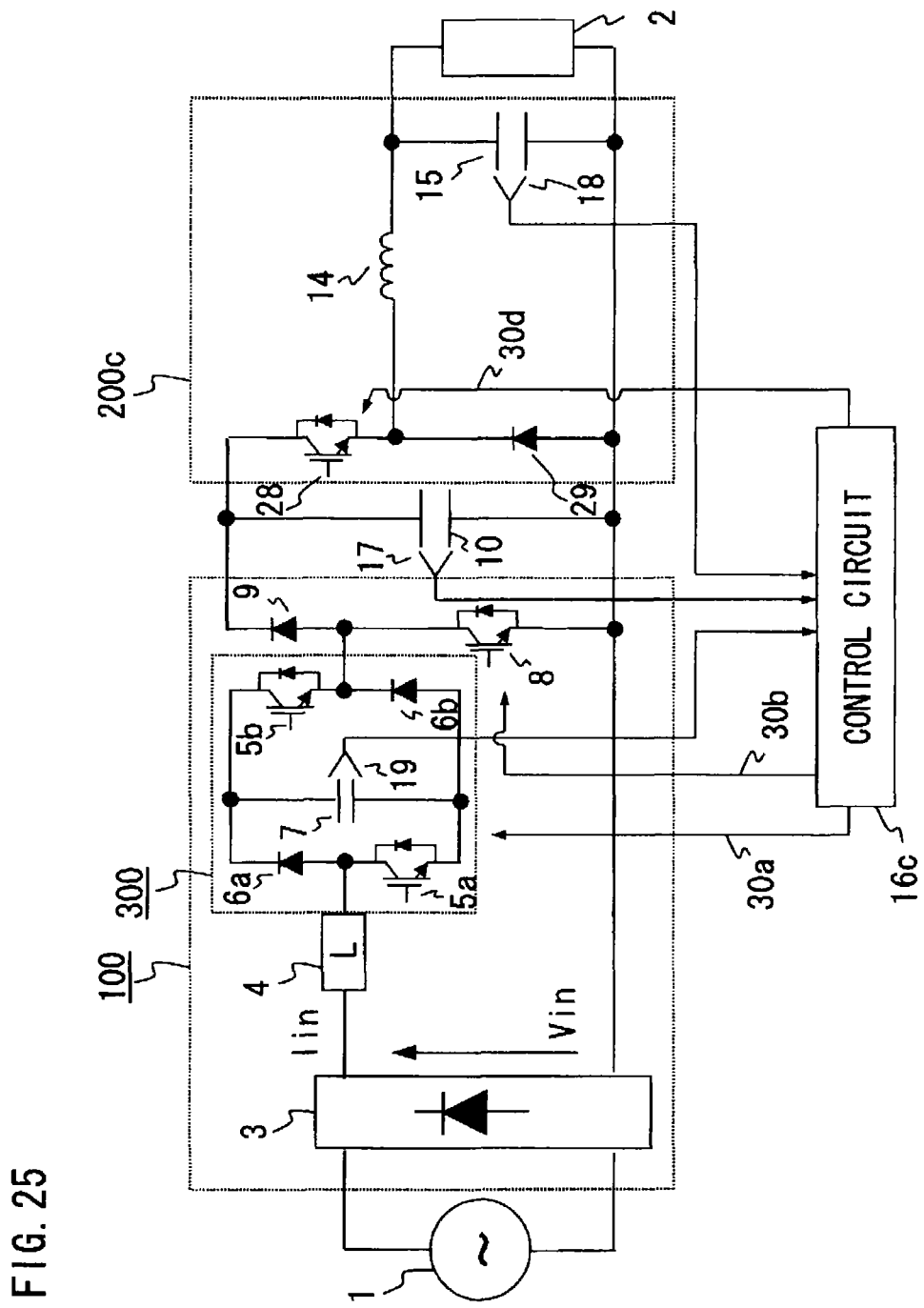
FIG. 25 is a configuration diagram of a power conversion apparatus according to embodiment 5 of the present invention.

In the power conversion apparatus of the above embodiments 1 to 4, the primary side and the secondary side are insulated from each other by the transformer 12 in the DC/DC converter section. In the present embodiment, the case of applying a non-insulation circuit will be described. FIG. 25 is a diagram showing the circuit configuration of a power conversion apparatus according to embodiment 5 of the present invention. As shown in FIG. 25, a DC/DC converter section 200c is composed of a general step-down chopper comprising a semiconductor switching device 28, a diode 29, the reactor 14 for smoothing, and the capacitor 15 for smoothing.

A control circuit 16c outputs the drive signals 30a and 30b for the semiconductor switching devices 5a and 5b and the short-circuit switch 8 in the high-power-factor converter section 100, and a drive signal 30d as a duty instruction for the semiconductor switching device 28 in the DC/DC converter section 200c.

The other configurations are the same as those shown in FIG. 11 in the above embodiment 1.

Also in the present embodiment, as in the above embodiment 1, as shown in FIG. 10, feedback control is performed such that the difference between a predetermined duty set value and the generated duty instruction approaches zero, thereby adjusting the target voltage Vdc* of the smoothing capacitor 10. In addition, the high-power-factor converter section 100 is controlled as shown in FIGS. 6(a) and 6(b), and the drive signal 30d as a duty instruction for driving the semiconductor switching device 28 is outputted such that the output voltage Vout as a DC output follows the output voltage instruction value Vout* as shown in FIG. 8, thereby controlling the DC/DC converter section 200c.

Thus, in accordance with the output voltage Vout of the DC/DC converter section 200c which is a DC output to the load 2, the control circuit 16c adjusts the target voltage Vdc* of the smoothing capacitor 10 such that the duty ratio of the semiconductor switching device 28 of the DC/DC converter section 200c approaches the duty set value, thereby controlling the high-power-factor converter section 100 and the DC/DC converter section 200c. If the duty ratio that allows the DC/DC converter section 200c to operate in an optimum condition that decreases loss is used as the duty set value, the effect of reducing power loss, improving power conversion efficiency, and reducing the size of the apparatus, can be provided as in the above embodiment 1.

In addition, since the current increase gradient of the reactor 14 for smoothing can be controlled to be substantially constant regardless of the magnitude of the output voltage Vout, it becomes possible to reduce the size of the reactor 14 for smoothing.

Also in this case, the original target voltage Vdc* of the smoothing capacitor 10 when the voltage instruction value Vout* is to be changed may be determined so as to optimize the duty ratio of the semiconductor switching device 28.

Further, even if the control for adjusting the target voltage Vdc* of the smoothing capacitor 10 in accordance with the output voltage Vout is omitted, since the target voltage Vdc* is determined in accordance with the voltage instruction value Vout*, the effect of reducing power loss and reducing the size of the apparatus can be provided.

For example, when the duty ratio of the semiconductor switching device 28 is 100%, the semiconductor switching device 28 is always ON, and if voltage drop in the semiconductor switching device 28 and the reactor 14 for smoothing is ignored, the output voltage Vout of the DC/DC converter section 200c is equal to the input voltage Vdc (the voltage of the smoothing capacitor 10). Therefore, if the target voltage Vdc* of the smoothing capacitor 10 is set as Vdc*=Vout*, the duty ratio of the semiconductor switching device 28 becomes 100%, whereby switching loss does not occur in the semiconductor switching device 28.

However, the range in which the voltage Vdc of the smoothing capacitor 10 for output in the high-power-factor converter section 100 is variable is determined by the voltage Vin of the AC voltage source 1. Therefore, if the output voltage Vout* is equal to or lower than the lower limit value of the range in which the voltage Vdc of the smoothing capacitor 10 is variable, the high-power-factor converter section 100 sets Vdc* at the lower limit value of the range in which the voltage Vdc of the smoothing capacitor 10 is variable, and then, for the remaining difference, the voltage Vout of the capacitor 15 is caused to follow the voltage instruction value Vout* by duty control for the semiconductor switch 28 of the DC/DC converter section 200c.

Such control may be performed by synchronized rectification, using a MOSFET, instead of the diode 29 of the DC/DC converter section 200c.

Although the case where the DC/DC converter section 200c is a general step-down chopper has been described, the circuit configuration is not limited thereto. Another non-insulation type DC/DC converter such as a step-up chopper or a step-up/down chopper may be used.

The invention claimed is:

1. A power conversion apparatus comprising:
an AC/DC converter which converts an AC voltage to a DC voltage;
a smoothing capacitor connected to the DC side of the AC/DC converter;
a DC/DC converter, comprising a semiconductor switch, which performs DC/DC conversion for DC power of the smoothing capacitor and outputs the resultant power to a load; and
a controller which controls the AC/DC converter such that a power factor of AC is controlled and the DC voltage of the AC/DC converter follows a DC voltage target value, and which controls the DC/DC converter by controlling a duty ratio of the semiconductor switch such that a DC input/output between the DC/DC converter and the load follows an instruction value, wherein
the controller adjusts the DC voltage target value of the AC/DC converter such that the duty ratio of the semiconductor switch of the DC/DC converter approaches a set value.

2. The power conversion apparatus according to claim 1, wherein
the controller generates a duty instruction for the semiconductor switch such that a voltage or a current as the DC input/output between the DC/DC converter and the load follows the instruction value, thereby performing duty control for the semiconductor switch based on the duty instruction, and generates the DC voltage target value of the AC/DC converter such that the duty instruction approaches the set value, thereby controlling the AC/DC converter.

3. The power conversion apparatus according to claim 1, wherein
the DC/DC converter comprises:
a transformer that is insulated;
a converter connected to one end of the transformer and having a plurality of the semiconductor switches, the converter converting a DC voltage of the smoothing capacitor to an AC voltage; and
a rectification circuit connected to the other end of the transformer.

4. The power conversion apparatus according to claim 1, wherein
the DC/DC converter is configured so that the semiconductor switch performs soft switching, and
the controller adjusts the DC voltage target value so that the semiconductor switch of the DC/DC converter to perform performs soft switching, and controls the DC/DC converter by using soft switching of the semiconductor switch.

5. The power conversion apparatus according to claim 4, wherein
the DC/DC converter comprises:
a transformer that is insulated;
a converter connected to one end of the transformer and having a plurality of the semiconductor switches, the converter converting the DC voltage of the smoothing capacitor to an AC voltage; and
a rectification circuit connected to the other end of the transformer,
the converter comprises:
a capacitor connected in parallel to each of the semiconductor switches; and
a reactor connected to an AC line, and
the controller adjusts the DC voltage target value of the AC/DC converter so that the plurality of semiconductor switches in the DC/DC converter to perform zero-voltage switching.

6. The power conversion apparatus according to claim 4, wherein:
the DC/DC converter comprises:
a transformer that is insulated;
a converter connected to one end of the transformer and having a plurality of the semiconductor switches, the converter converting a DC voltage of the smoothing capacitor to an AC voltage; and
a rectification circuit connected to the other end of the transformer, the converter comprises:
a capacitor connected in parallel to each of the semiconductor switches; and
a reactor connected to an AC line, and wherein
the controller controls the plurality of semiconductor switches of the DC/DC converter by using zero-voltage switching, and
the controller decreases the DC voltage target value of the AC/DC converter so as to increase the current in the reactor, and increases the DC voltage target value of the AC/DC converter so as to decrease the current in the reactor.

7. The power conversion apparatus according to claim 1, wherein
the AC/DC converter comprises:
an inverter circuit including one or more single-phase inverters whose AC sides are connected in series and each of which includes a plurality of semiconductor switches and a DC voltage source, the inverter circuit superimposing the sum of output voltages of the single-phase inverters onto the AC voltage; and
a bridge circuit having a switch and connected to the inverter circuit.

8. The power conversion apparatus according to claim 7, wherein
the controller controls the bridge circuit such that the voltage of the DC voltage source of the inverter circuit follows an instruction value, and controls the inverter circuit by using a current instruction such that the DC voltage of the AC/DC converter follows the DC voltage target value.

9. The power conversion apparatus according to claim 1, wherein:
the AC/DC converter comprises a plurality of semiconductor switches, and
the controller controls the plurality of semiconductor switches of the AC/DC converter and the semiconductor switch of the DC/DC converter such that switching frequencies thereof are different from each other.

10. A power conversion apparatus, comprising:
an AC/DC converter which converts an AC voltage to a DC voltage;
a smoothing capacitor connected to the DC side of the AC/DC converter;
a DC/DC converter, comprising a semiconductor switch, which performs DC/DC conversion for DC power of the smoothing capacitor and outputs the resultant power to a load; and
a controller which controls the AC/DC converter such that a power factor of AC is controlled and the DC voltage of the AC/DC converter follows a DC voltage target value, and which controls the DC/DC converter by duty control for the semiconductor switch such that a DC input/output between the DC/DC converter and the load follows an instruction value,
wherein the controller determines the DC voltage target value of the AC/DC converter, based on the instruction value of the DC input/output between the DC/DC converter and the load, so as to optimize the duty ratio of the semiconductor switch of the DC/DC converter.

11. The power conversion apparatus according to claim 10, wherein
the DC/DC converter comprises:
a transformer that is insulated;
a converter connected to one end of the transformer and having a plurality of the semiconductor switches, the converter converting the DC voltage of the smoothing capacitor to an AC voltage; and
a rectification circuit connected to the other end of the transformer.

12. The power conversion apparatus according to claim 10, wherein
the DC/DC converter is configured so that the semiconductor switch performs soft switching, and
the controller adjusts the DC voltage target value so that the semiconductor switch of the DC/DC converter performs soft switching, and controls the DC/DC converter by using soft switching of the semiconductor switch.

13. The power conversion apparatus according to claim 10, wherein
the AC/DC converter comprises:
an inverter circuit including one or more single-phase inverters whose AC sides are connected in series and each of which includes a plurality of semiconductor switches and a DC voltage source, the inverter circuit superimposing the sum of output voltages of the single-phase inverters onto the AC voltage; and
a bridge circuit having a switch and connected to the inverter circuit.

14. The power conversion apparatus according to claim 13, wherein
the controller controls the bridge circuit such that the voltage of the DC voltage source of the inverter circuit follows an instruction value, and controls the inverter circuit by using a current instruction such that the DC voltage of the AC/DC converter follows the DC voltage target value.

15. The power conversion apparatus according to claim 10, wherein:
the AC/DC converter comprises a plurality of semiconductor switches, and
the controller controls the plurality of semiconductor switches of the AC/DC converter and the semiconductor switch of the DC/DC converter such that switching frequencies thereof are different from each other.

16. A power conversion apparatus, comprising:
an AC/DC converter which converts an AC voltage to a DC voltage;
a smoothing capacitor connected to the DC side of the AC/DC converter;
a DC/DC converter, comprising a semiconductor switch, which performs DC/DC conversion for DC power of the smoothing capacitor and outputs a resultant power to a load; and
a controller which controls the AC/DC converter such that a power factor of AC is controlled and the DC voltage of the AC/DC converter follows a DC voltage target value, and which controls the DC/DC converter by duty control for the semiconductor switch such that a DC input/output between the DC/DC converter and the load follows an instruction value, wherein:
the controller adjusts the DC voltage target value of the AC/DC converter so that the semiconductor switch in the DC/DC converter performs soft switching,
the DC/DC converter comprises:
a transformer that is insulated;
a converter connected to one end of the transformer and having a plurality of the semiconductor switches, the converter converting a DC voltage of the smoothing capacitor to an AC voltage; and
a rectification circuit connected to the other end of the transformer,
the converter comprises a series circuit, including a reactor and a capacitor, which is connected to an AC line, and
the controller adjusts the DC voltage target value of the AC/DC converter so that the plurality of semiconductor switches in the DC/DC converter perform zero-current switching, and
the controller determines a set value of the duty ratio of the plurality of semiconductor switches so that the plurality of semiconductor switches of the DC/DC converter to perform zero-current switching, and adjusts the DC voltage target value of the AC/DC converter such that the duty ratio of the plurality of semiconductor switches approaches the set value.

17. A power conversion apparatus, comprising:
an AC/DC converter which converts an AC voltage to a DC voltage;
a smoothing capacitor connected to the DC side of the AC/DC converter;
a DC/DC converter, comprising a semiconductor switch, which performs DC/DC conversion for DC power of the smoothing capacitor and outputs a resultant power to a load; and
a controller which controls the AC/DC converter such that a power factor of AC is controlled and the DC voltage of the AC/DC converter follows a DC voltage target value, and which controls the DC/DC converter by duty control for the semiconductor switch such that a DC input/output between the DC/DC converter and the load follows an instruction value, wherein:
the controller adjusts the DC voltage target value of the AC/DC converter so that the semiconductor switch in the DC/DC converter performs soft switching,
wherein
the AC/DC converter comprises:
an inverter circuit including one or more single-phase inverters whose AC sides are connected in series and each of which efincludes a plurality of semiconductor switches and a DC voltage source, the inverter circuit superimposing the sum of output voltages of the single-phase inverters onto the AC voltage; and
a bridge circuit having a switch and connected to the inverter circuit,
the controller controls the bridge circuit such that the voltage of the DC voltage source of the inverter circuit follows an instruction value, and controls the inverter circuit by using a current instruction such that the DC voltage of the AC/DC converter follows the DC voltage target value.

18. The power conversion apparatus according to claim 17, wherein
the DC/DC converter comprises:
a transformer that is insulated;
a converter connected to one end of the transformer and having a plurality of the semiconductor switches, the converter converting a DC voltage of the smoothing capacitor to an AC voltage; and
a rectification circuit connected to the other end of the transformer, the converter comprises:
a capacitor connected in parallel to each of the semiconductor switches; and
a reactor connected to an AC line, and wherein
the controller controls the plurality of semiconductor switches of the DC/DC converter by using zero-voltage switching, and
the controller decreases the DC voltage target value of the AC/DC converter so as to increase the current in the reactor, and increases the DC voltage target value of the AC/DC converter so as to decrease the current in the reactor.

* * * * *